(12) United States Patent
Brown

(10) Patent No.: US 6,578,528 B1
(45) Date of Patent: Jun. 17, 2003

(54) SYSTEM AND AN APPARATUS FOR CONFINING A PET WITHIN A PRESELECTED AREA

(76) Inventor: David W. Brown, 1706 Hidden Springs Trace, Smyrna, GA (US) 30082

( * ) Notice: Subject to any disclaimer, the term of this patent is extended or adjusted under 35 U.S.C. 154(b) by 2 days.

(21) Appl. No.: 09/792,769

(22) Filed: Feb. 23, 2001

(51) Int. Cl.$^7$ .................................................. A01K 1/04
(52) U.S. Cl. ....................................................... 119/769
(58) Field of Search ................................. 119/769, 784, 119/786, 791, 770; 482/108, 105, 106

(56) References Cited

U.S. PATENT DOCUMENTS

| 450,633 | A | | 4/1891 | Motter | |
|---|---|---|---|---|---|
| 582,702 | A | | 5/1897 | Snell | |
| 704,730 | A | | 7/1902 | Zierleyn | |
| 753,835 | A | * | 3/1904 | Albee | 119/769 |
| 762,439 | A | * | 6/1904 | Reddish | 119/769 |
| 843,543 | A | | 2/1907 | Matsumoto | 114/294 |
| 1,738,581 | A | * | 12/1929 | Hodgson | 119/770 |
| 2,484,263 | A | | 10/1949 | Atkinson | 119/121 |
| 2,491,951 | A | | 12/1949 | Buettner et al. | 119/96 |
| 3,315,642 | A | | 4/1967 | Rogers et al. | 119/109 |
| 3,395,675 | A | * | 8/1968 | Fowlkes | 119/784 |
| 3,749,063 | A | * | 7/1973 | Buffum | 119/61 |
| 3,751,031 | A | * | 8/1973 | Yamauchi | 273/DIG. 19 |
| 4,147,129 | A | | 4/1979 | Ruplen | 119/1 |
| 4,597,359 | A | | 7/1986 | Moorman | 119/1 |
| 4,802,443 | A | | 2/1989 | Denmark | 119/19 |
| 5,000,123 | A | * | 3/1991 | Morse et al. | 119/61 |
| 5,085,174 | A | | 2/1992 | Etkin | 119/169 |
| 5,112,023 | A | | 5/1992 | Sowers | 248/519 |
| 5,165,365 | A | | 11/1992 | Thompson | 119/61 |
| 5,373,814 | A | | 12/1994 | Seymour | 119/795 |
| 5,445,113 | A | | 8/1995 | Hostetler | 119/795 |
| 5,452,877 | A | | 9/1995 | Riffle et al. | 248/511 |
| 5,456,214 | A | | 10/1995 | Quilling | 119/795 |
| D365,177 | S | | 12/1995 | Farrell | D30/154 |
| 5,829,392 | A | | 11/1998 | Coleman | 119/795 |
| 5,870,974 | A | | 2/1999 | Johnson | 119/786 |
| 5,894,748 | A | * | 4/1999 | Capperrune | 70/16 |
| 5,950,570 | A | * | 9/1999 | Dickerson | 119/792 |
| 6,237,540 | B1 | * | 5/2001 | Vandracsek | 119/791 |
| 6,435,137 | B1 | * | 8/2002 | Hourihan | 119/788 |

* cited by examiner

Primary Examiner—Charles T. Jordan
Assistant Examiner—John W. Zerr
(74) Attorney, Agent, or Firm—Bracewell & Patterson, LLP

(57) ABSTRACT

A system and an apparatus for confining a pet within a preselected area is provided wherein the pet is secured to and restrained by a pet anchoring apparatus that is relatively devoid of obstacles and potentially impaling protrusions, that can be varied in weight and size to accommodate the pet and the environment of the area in which the pet is to be confined, and that can be provided with an auxiliary cover to thereby associate the apparatus uniquely with the pet is to be restrained or with the environment of the area in which the pet is to be confined. The system incorporates the apparatus along with additional features that protect the environment of the area in which the pet is confined against accidents and spills.

82 Claims, 17 Drawing Sheets

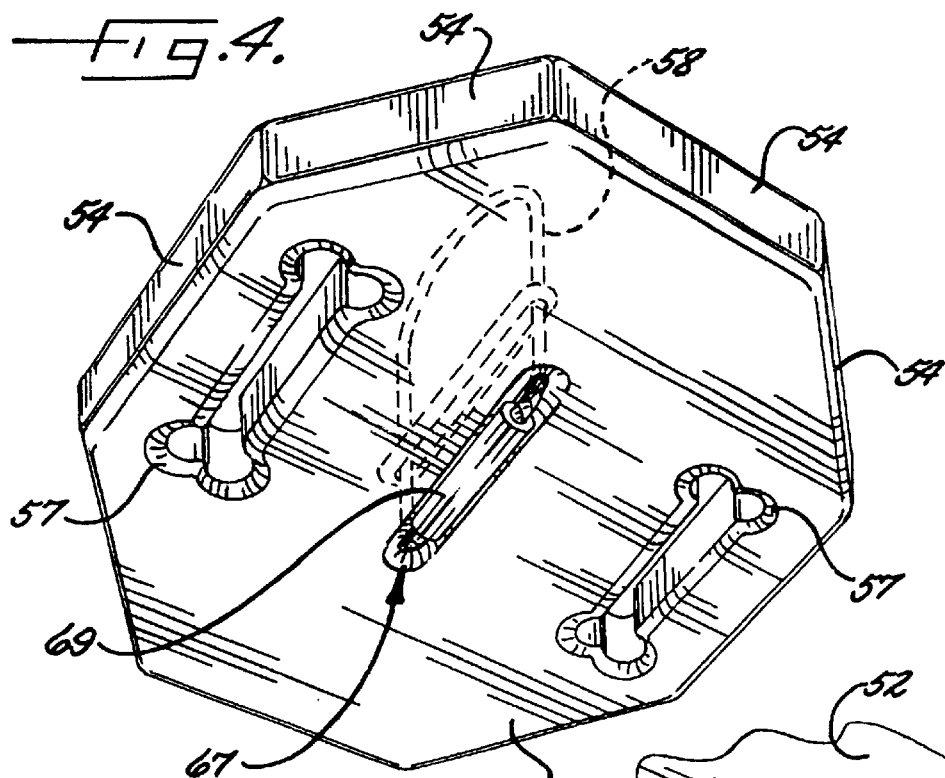
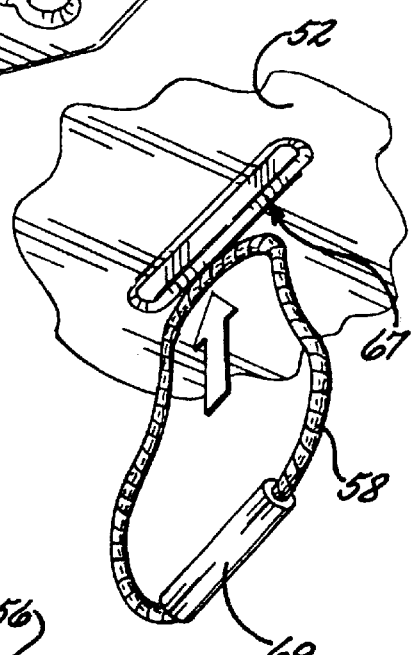
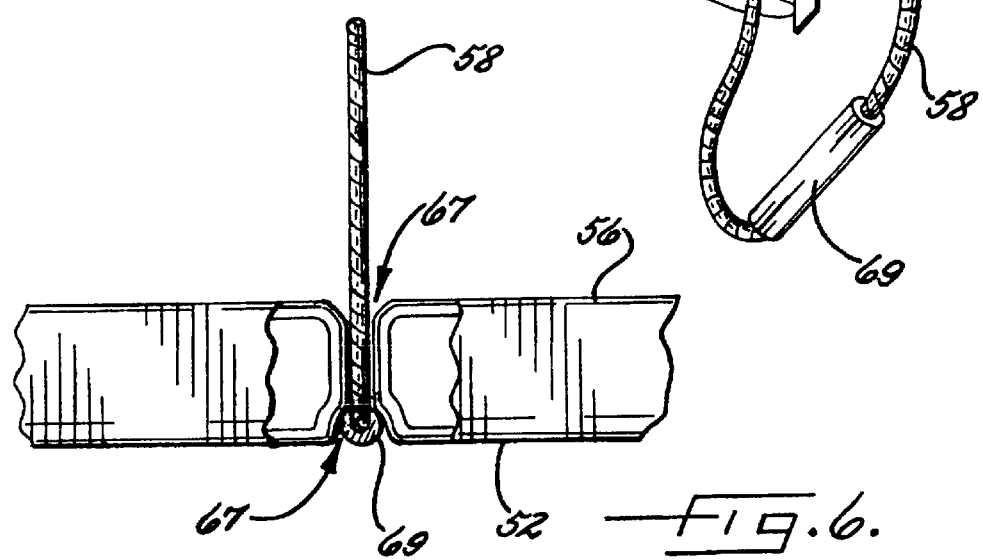

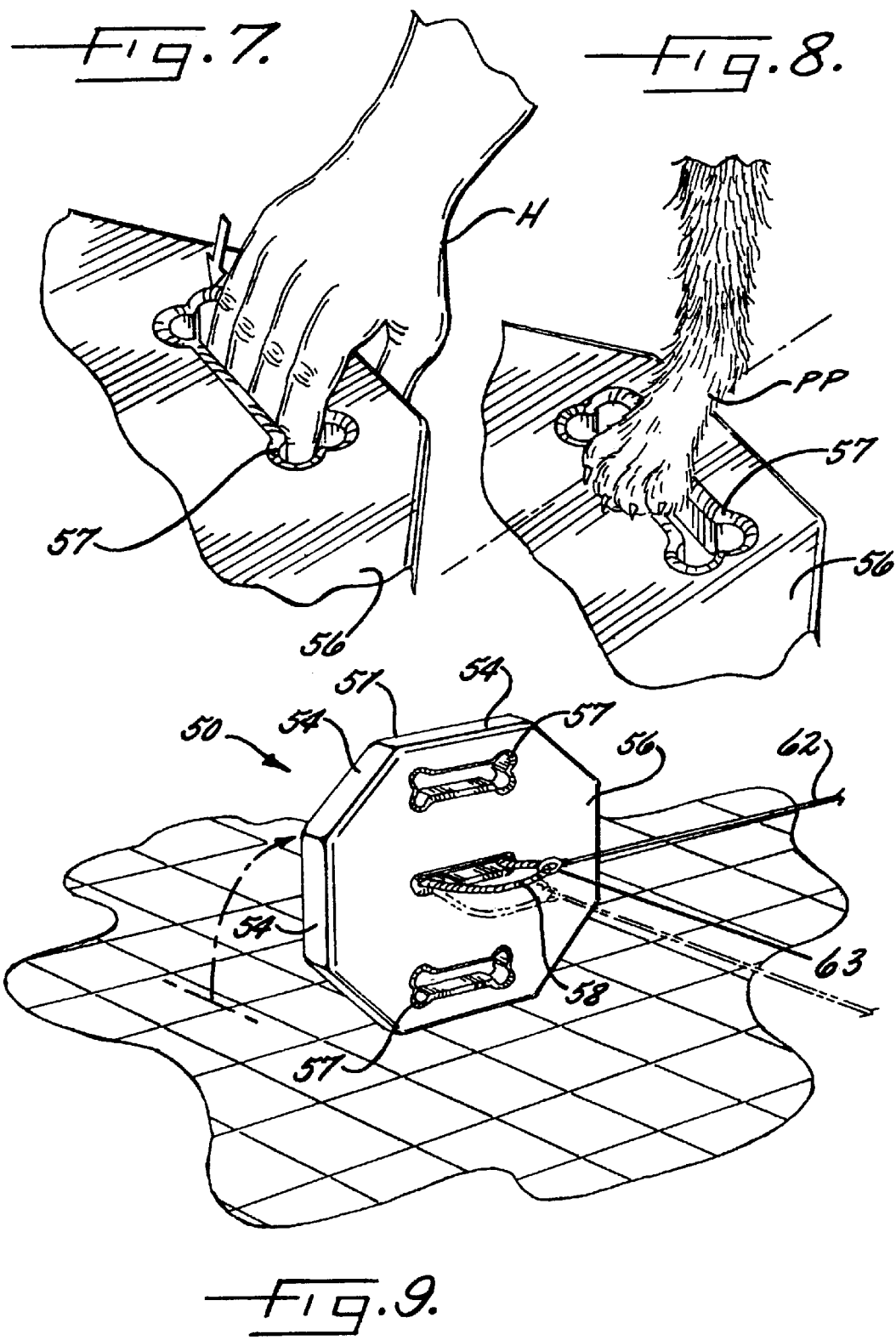

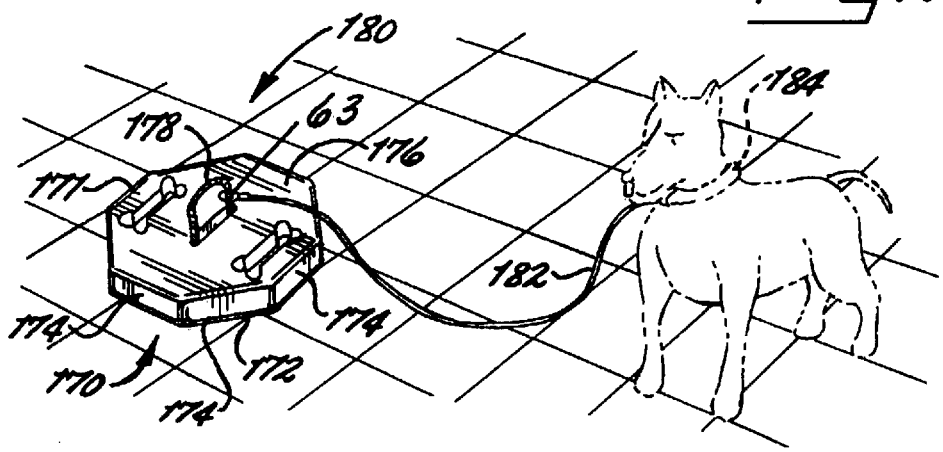
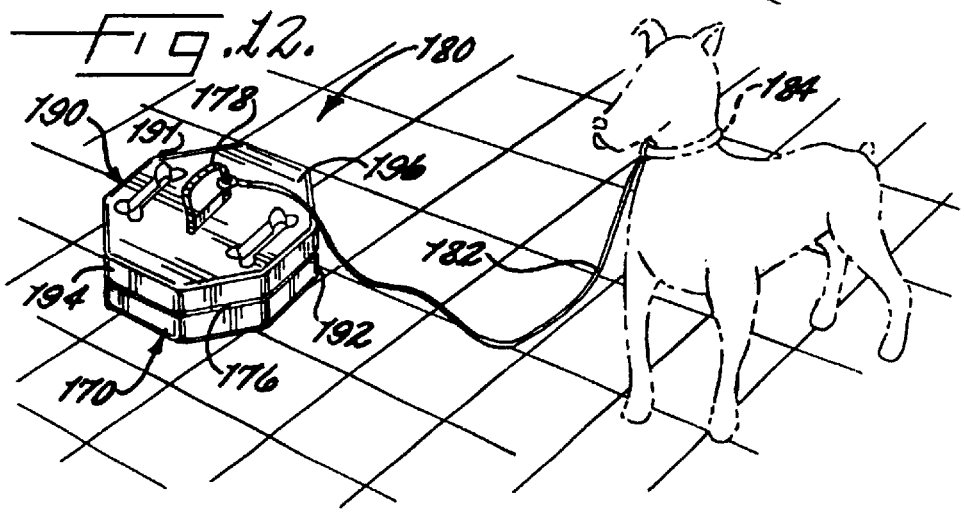
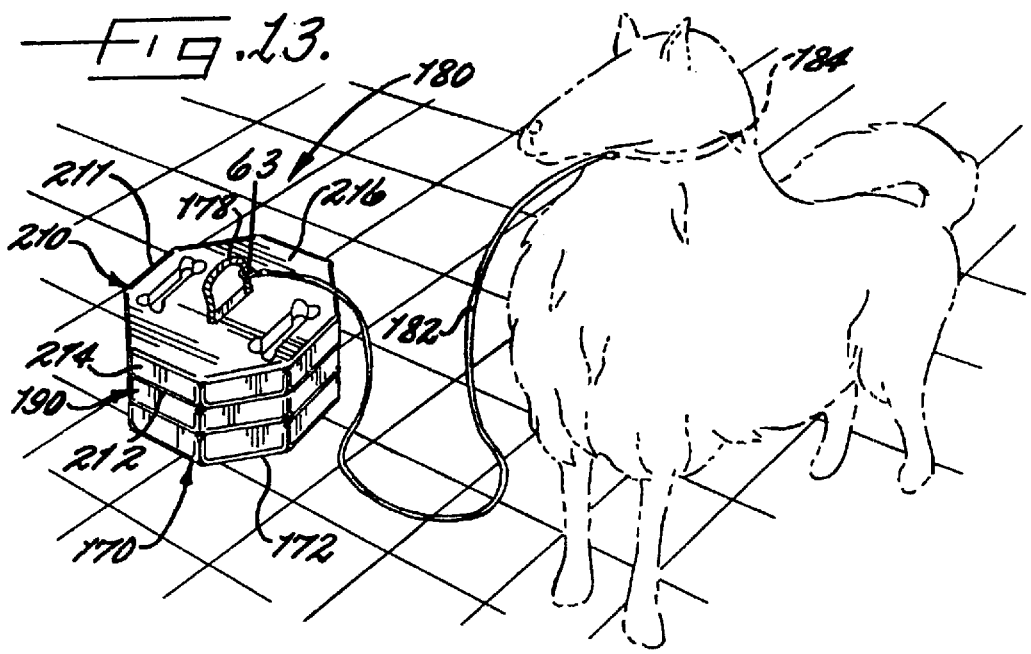

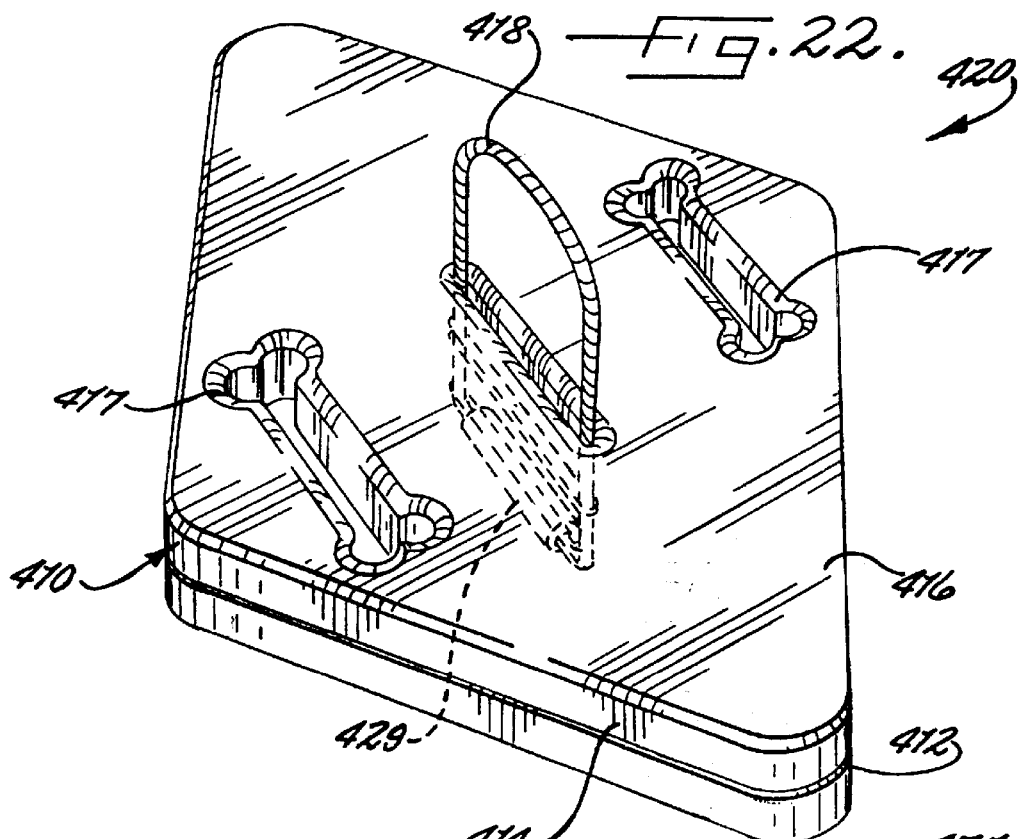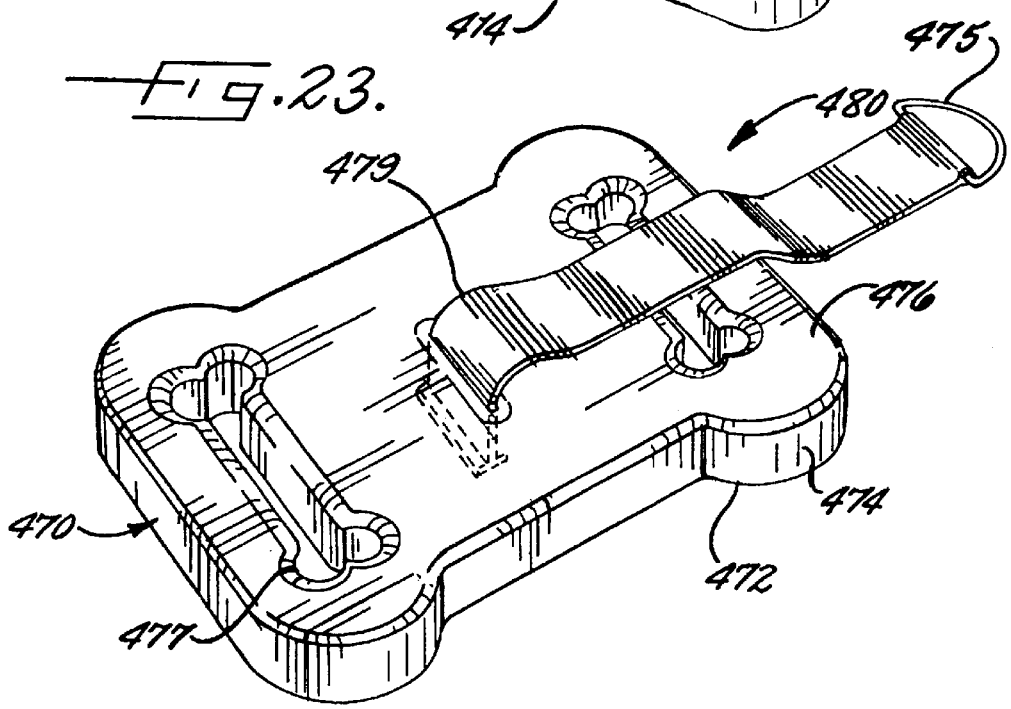

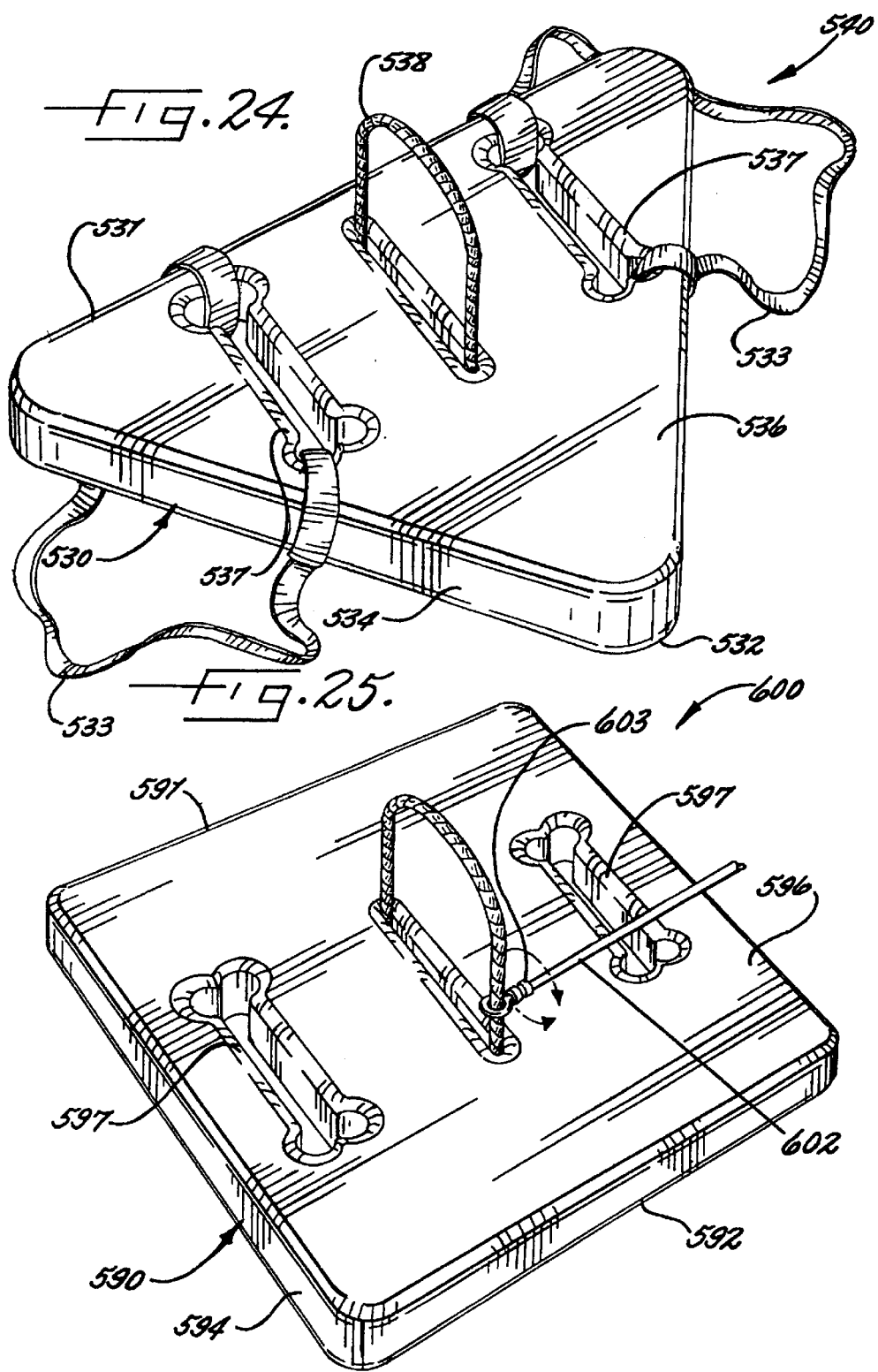

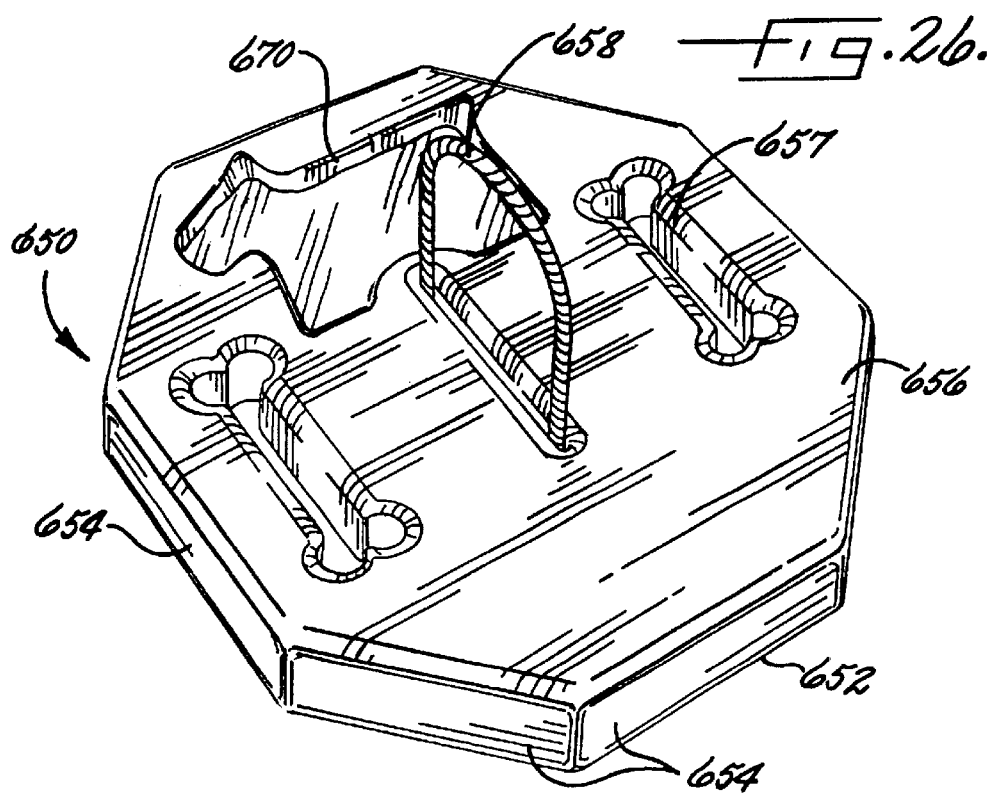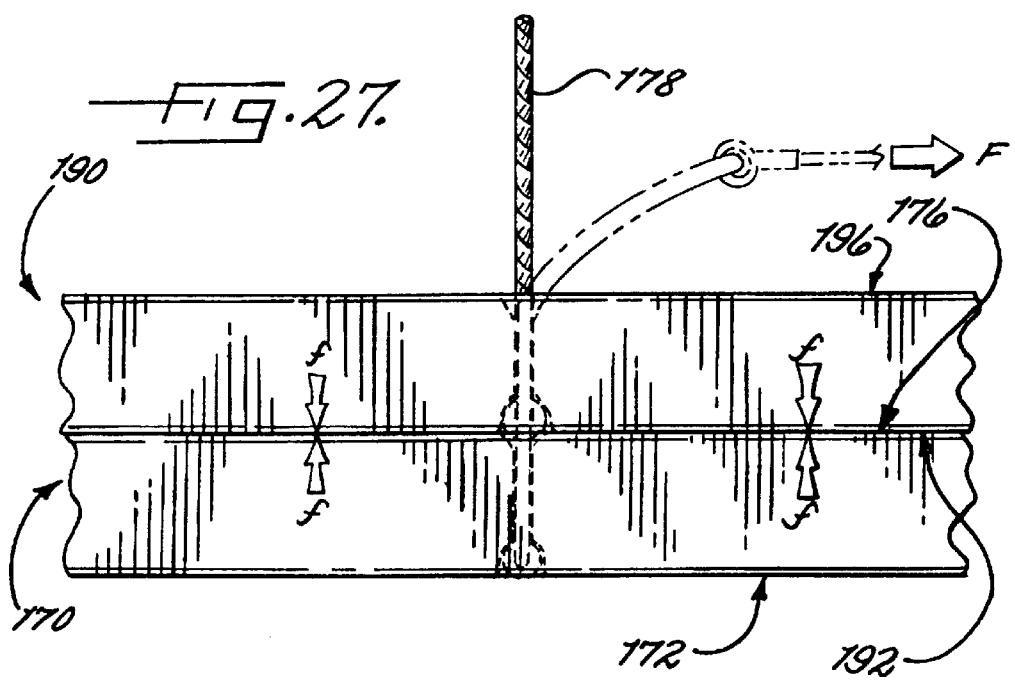

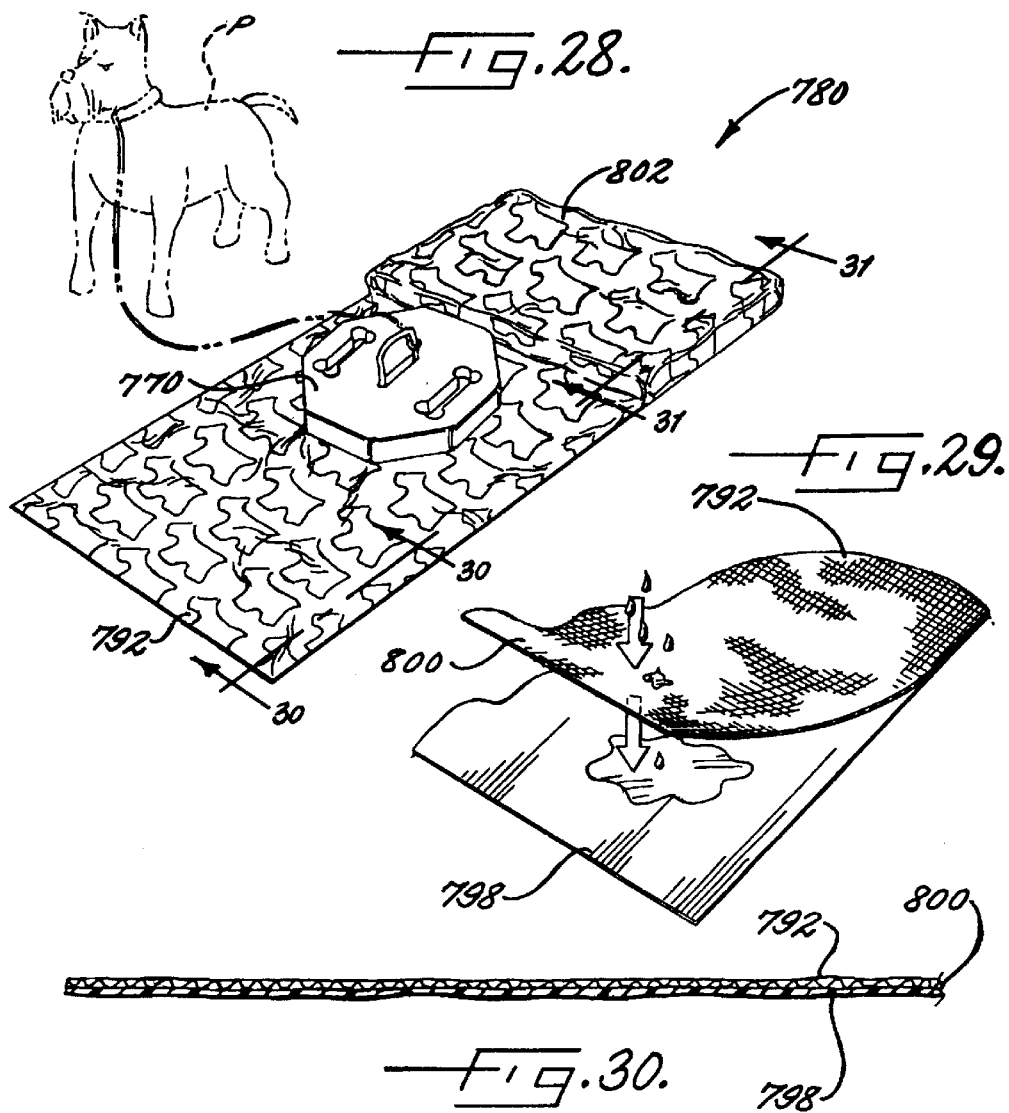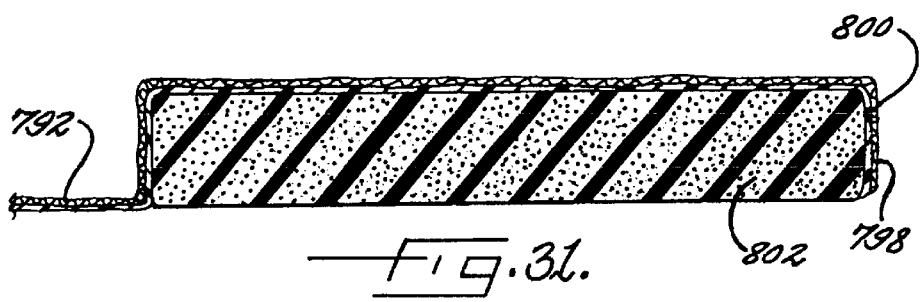

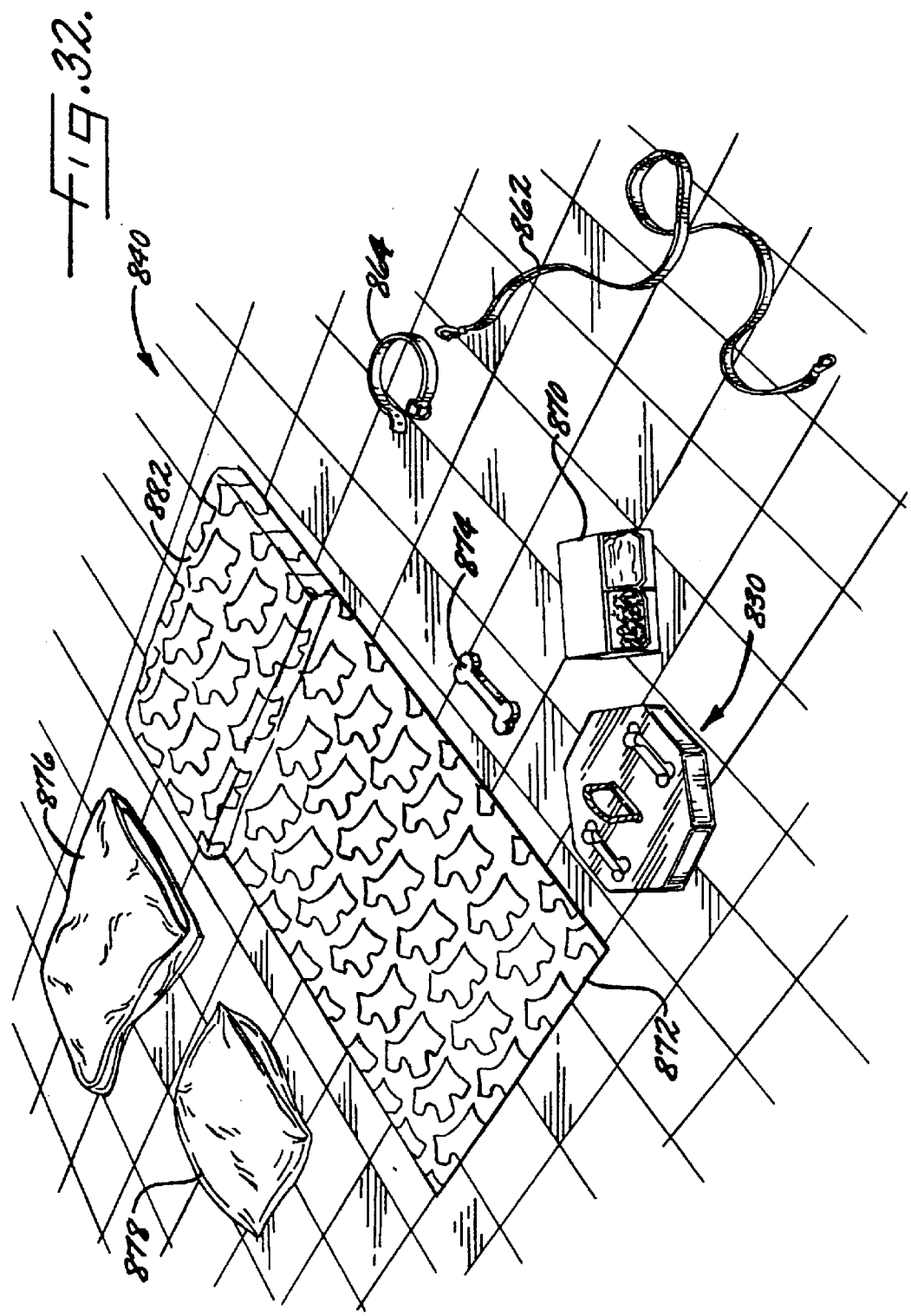

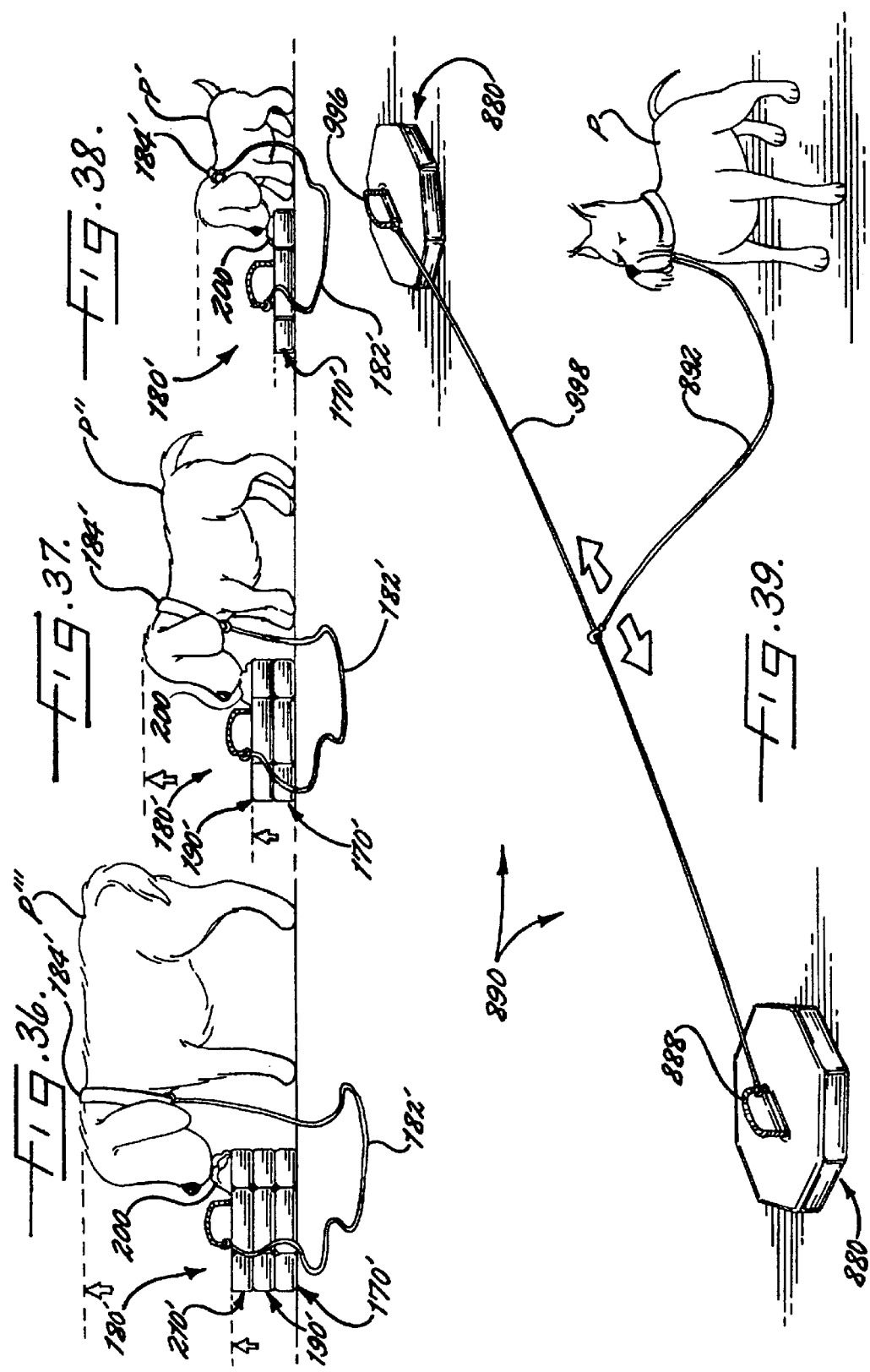

SYSTEM AND AN APPARATUS FOR CONFINING A PET WITHIN A PRESELECTED AREA

RELATED APPLICATION

This application is related to co-pending application titled A Kit and Related Methods for Confining a Pet Within A Preselected Area, Ser. No. 09/792,846, filed the same date herewith and which is incorporated herein in its entirety.

FIELD OF THE INVENTION

This invention relates to the pet industry and, more particularly to pet restraint systems and methods.

BACKGROUND OF THE INVENTION

The demand for safe, effective, and convenient devices and methods for restraining domestic pet animals has increased considerably over the years as society has continued to become more urbanized. With more and more families living in urban and suburban areas and facing constraints on available outdoor and indoor space, it has become more difficult to efficiently and effectively confine a dog or other pet within a predetermined area using conventional methods. Moreover, regardless of whether the particular environment in which the animal is found is urban or rural, letting the animal wander about unrestrained can pose obvious problems for the pet, its owner, and others in the community—problems only exacerbated as traffic and congestion increases in proportion to the urbanization of the animal's surroundings.

Conventional devices and methods as were employed in the past such as lashing the animal to a tree or stake in the ground are not easily adapted to a more urbanized environment. Nor are these devices and methods necessarily the safest or most efficient way to restrain a pet, and yet, fencing in the animal may not be an option for a pet owner having only limited or no yard space in which to confine the animal. Moreover, even for those in a rural environment or having at least a limited amount of yard space, fencing may not be aesthetically desirable or economical. Still, too, fencing in the animal is only a partial solution because of its permanence: if one desires to take the animal temporarily to a new location such as a beach or a park, the fence provides no assistance in confining the pet to a predetermined area in the temporary environment. And, while pet cages generally can be transported, they must have a very limited size if they are to be transported easily. Yet a limited-sized cage is very uncomfortable to a pet. Moreover, even limited-sized cages are unsightly, yet enlarging a cage to make it more comfortable for the pet inevitably makes the cage more difficult to transport and more unsightly. These same inherent disadvantages in using conventional devices and methods in an outdoor environment make such devices and methods particularly ill-suited or entirely ineffectual in an indoor setting such as a house or an apartment.

Some recent attempts have been made to improve on or adapt these conventional devices and methods to more urban settings. For example, U.S. Pat. No. 5,085,174 by Etkin, titled Pet Trainer is a device intended primarily for use in house training a dog confined to limited-space indoor environment. The device is essentially a wide-panel platform surrounded by a continuous peripheral lip over which newspapers can be placed and a centered protruding post to which the dog is tethered. Similarly, U.S. Pat. No. 4,147,129 by Ruplen, titled Animal Platform provides a platform and tether post, its major differences being that the platform provides a sleep station and the protruding tether post is closer to the platform surface.

These devices are limited, however, in a number of respects. Both rely not on the weight of the platform to restrain the dog, but rather to the fact that the length of the restraining cord tethering the dog to the centered post is sufficiently short to prevent the animal from straying entirely off the platform; confined to the platform, the pet's weight essentially serves to anchor the platform on which the pet is tethered. Thus, the size of the platform dictates and limits the area to which the pet can be confined. If one wanted to increase the area within which the dog were free to roam, for example, within a large kitchen, one could not do so because the dog would then be free to step off the platform, which in turn, would then be unconstrained by the dog's weight and could be turned over or pulled in any direction by the animal. Moreover, the rectangular dimensions of both platforms dictate the type of area within which each can be used efficiently. The invariable dimensions preclude use of the platforms in an area smaller than or having a peripheral boundary different from that of the platforms. Neither would be readily usable, for example, in a long narrow hallway.

Certain other devices, perhaps seeking to overcome these disadvantages, have taken a different tack by attempting to tether the animal to an anchor. For example, U.S. Pat. No. 5,456,214 ("'214 patent") by Quilling, titled Tether Balls and Leash for Tethering Pets describes a pair of plastic coated heavy metallic balls serving as an anchor to which a dog or cat is tethered. But this approach poses its own problems. One problem arises from the elimination of the pet-weighted platform: of necessity, the bi-spherical anchor (i.e., the pair of metallic tether balls) remains quite heavy as well as poses a significant physical obstacle. If one desires more weight, additional balls can be strung together, but this only increases the clumsiness of the arrangement and the size of the physical obstacle posed by a plurality of spherical anchors. Another problem stems from the fact that each anchor has a welded link (like that of a chain) that connects to a latch on a tethering leash, but the spherical nature and size of the weight prevents more than a few of the anchors from being joined to the same leash.

The '214 patent shares some similarity with U.S. Pat. No. 704,730 ("'730 Patent") by Zierleyn, titled Hitching Weight, which describes a heavy anchor having a circular base that is hurled from a horse and buggy, and U.S. Pat. No. 450,633 ("'663 Patent") by Motter, also titled Hitching Weight, which provides a horse hitch in the form of an extendable chain wound around a drum encased in a metallic, barrel-like cylindrical casing. These devices, too, possess features that are disadvantageous in the context of restraining a pet. Each, for example, has a centered protrusion on which pet or a human moving within a relatively confined area could stumble and perhaps even become impaled. The centered protrusion of the '730 patent is a gravity stop to engage the drum-wound chain. In the '633 patent, it is an eye-hook extending from the top of a heavy anchor to which a hitching strap connects so that the weight can be slung from a horse drawn carriage like an anchor thrown over the side of a ship. In the context of restraining a pet, both the vertical protrusions associated with both devices pose significant disadvantages. Not only could they impale the pet or a person moving within a confined area, they also are an obstacle to portability if one desires a device that is sufficiently compact and narrow so as to be easily moved and stored.

U.S. Pat. No. 5,870,974 ("'974 patent") by Johnson titled Animal Anchor borrows from these earlier devices, but poses some of the same disadvantages as well as ones of its own. The '974 patent provides a device having a central hub and a series of spokes that extend outwardly and upwardly from an outer circular rim portion to connect with the hub. Like the '730 and '633 patents, the '974 patent explicitly relies on a rim portion having an annular or cylindrical outer perimeter. Also like the '730 and '633 patents, the '974 has a centered protrusion in the form of a bolt that extends upwardly from the hub and to which is connected a closed-end S-hook or other connector for a restraining cord or chain. The upward protrusion, moreover, is enhanced by the elevation of the hub connected to the annular outer rim by the upwardly extending spokes.

In addition to the disadvantages posed by the upward protrusion, the '974 poses new ones as well to a pet or human moving around or over the device in that a pet may entangle its paw or a human a limb in the wide gaps between the spokes. This increases the potential for a pet or human to stumble over the device or otherwise become entangled between the spokes and possibly fall on the upward protrusion. A separate limitation of the device disclosed by the '974 patent also stems from the spokes-and-elevated-hub design in that there is no efficient or convenient way in which to couple an additional base portion, which provides most of the weight, to the device to thereby increase its weight according to that of the pet that is to be restrained.

In view of these and other conventional devices and methods for restraining a pet, there clearly is a need for a device and method that provide a secure restraint that is not only comfortable for the pet but also is convenient for the pet owner to transport, position, and use. There is also the need for a device that avoids posing as an obstruction to the pet and pet owner when used in a relatively confined space. There, moreover, is a need for a device or method that provides variable capabilities adjustable to the type and size of the pet as well as to the nature and extent of the area in which the pet is to be restrained, and that functions equally well within all areas, even those having irregular perimeters.

SUMMARY OF THE INVENTION

In view of the foregoing, the present invention advantageously provides an apparatus and a system for restraining the movement of pet within a preselected area by connecting the pet to an anchoring base that is easily transported and easily positioned within virtually any indoor or outdoor environment. A further advantage of the present invention is that it can efficiently be adjusted to accommodate virtually any sized pet. Furthermore, the present invention operates equally efficiently in any indoor and any outdoor environment, regardless of the shape and size of the particular perimeters within which it is desired that the pet be confined. Moreover, the present invention can restrain the movement of a pet without presenting entangling or protruding obstacles that might impale or otherwise obstruct movement of a pet or persons within the area of confinement. In addition, the present invention can be appropriately altered by use of a unique covering so as to be identifiable with or appeal to the pet being confined as well as to fit fashionably beside any indoor or outdoor decor.

More specifically, the present invention provides a portable pet anchoring apparatus to securely restrain the movement of a pet within a preselected area. As will be readily apparent as the features of the invention are described, the invention is equally useful with respect not only to conventional pets such as a dog or cat but even with more exotic animals such as a pet rabbit, parrot, iguana, or indeed any type of domestic animal.

The pet anchoring apparatus includes an anchoring base to which is positioned a flexible restraining cord connector, which in turn connects to a leash or other restraining cord that fastens to a pet collar, harness, muzzle, or to the pet directly. In one embodiment, the base is formed of a substantially solid material, having substantially solid top, side, and bottom surfaces. Preferably, the height of the sides is relatively low and the top and bottom surfaces are relatively thin so that the height of the base is accordingly relatively low, at least by comparison to a pet's paw or a person's foot so as to avoid posing an obstacle to a pet or persons moving near the base. In a similar vein, the surfaces of the base are preferably flat so as to avoid presenting unnecessary extensions over which a pet or person could stumble.

The restraining cord connector, for much the same reason, is preferably flexible so that it bends with rather than opposes any contact with a pet's paw or person's foot.

So, too, handles are provided on the base so it is easily transported. The handles preferably are formed in the base. More specifically, the handles are preferably formed by narrowly recessed openings through the base. The openings are narrow enough to make it difficult for a pet's paw to extend into the opening, yet at the same time, the openings are just wide enough to permit the fingers of a person to extend into the openings to make it easy for the person to lift and carry the anchoring base of the apparatus. This formation of the handles coupled with the substantially continuous flat surface of the top of the base provides distinct advantages over conventional devices that use a hub-and-spoke construction. Whereas the latter construction makes it easy for a pet to get its paw enmeshed in the base, the anchoring base of the present invention substantially reduces or eliminates the risk altogether.

The flexible cord connector on the anchoring base of the present invention connects with at least one restraining cord having a preselected length. As the length is varied, however, the extent of the area of which the pet can have free movement changes accordingly so that unlike, for example, fixed-platform devices having set dimensions, the apparatus can be adapted to provide a wide or narrow area of movement. Thus, too, the apparatus can be used equally well regardless of whether the area in which the pet is to be confined is long and narrow, square, or has a completely irregular shape.

This, then, is a distinct advantage over the platform-based devices that require that the pet remain on a platform of predetermined dimensions in that the present invention accommodates virtually all types of indoor and outdoor areas.

Not only is the apparatus adjustable according to the particular area in which the pet is to be confined, but so, too, the weight of the restraining anchor can vary to accommodate variously sized pets. In one embodiment, specifically, the anchoring base further includes a second anchoring base that overlies or otherwise connects with the first to thereby add additional weight to the pet anchoring apparatus. Additional, or auxiliary, anchoring bases can be added in a vertical stack virtually at will so as to increase the weight of a combination anchoring base to accommodate a pet of virtually any weight. Weight variability for restraining the pet using an anchoring base can also be effected with yet a fourth embodiment of the present invention in which the weight of the base of the pet anchoring apparatus is changed by adding or discharging a liquid or particulate matter to an inner cavity within the base. The liquid might be water from a kitchen faucet or sand collected at the beach; the apparatus is equally usable in any such environment. Moreover, the ability to discharge the liquid or particulate matter when the base is not being used makes the apparatus all the more portable. The restraining capacity of the anchoring base of the apparatus can be even further enhanced using suction devices that can be positioned, for example, on the bottom surface of the base.

These various features of the present invention make it difficult for the pet to dislodge or move the anchoring base. If the base for some reason were upended, however, an additional advantageous feature of the present invention is called into play—that of the shape of the outer perimeter of the base. The outer perimeter of at least the bottom surface of the anchoring base is non-circular, having at least a portion being straight-edged or irregular in shape so as to prevent the base from rolling if for any reason it is upended and lying on its side. Specifically, the shape of the base of the apparatus can be diamond-shaped, square, rectangular, irregular, oreven dog-bone shaped. In any event, the non-circular nature of the base prevents it from rolling on its side and presents a distinct advantage over conventional, circular base devices.

The anchoring base of the pet anchoring apparatus is itself formed preferably of a concrete, metal, alloy, or similar material. The cover can be made of any material, but preferably is one that is a softer material than that of the base. The material, for example, can be a durable plastic overlying at least a portion of the base surface. The cover material also can be a synthetic rubber such as neoprene. Alternatively, the material can be a synthetic fiber or fabric made from a polymer containing polyurethane such as spandex and having elastic stretching properties. Such materials provide a dual benefit in that they can be smooth to the touch but have relatively high friction coefficients. The latter feature is advantageous with respect to two or more bases in contact with one another positioned in a vertical stack or horizontal array. Friction between the covered surfaces of bases in contact with one another can increase the stability of a combination anchoring base in that the friction reduces the likelihood that bases in contact with one another will slip out of position in a vertical stack or horizontal array. Moreover, the friction provides additional resistance to help prevent the base from sliding or otherwise moving in response to the pet straining against the restraining cord. Thus, the friction provided by the cover enhances the restraining capacity of the base independent of the base's weight. Accordingly, due to the friction feature of the cover, any single anchoring base can accommodate more varied types of pets over a fairly wide range of pet sizes and weights.

Preferably, the cover contacting the base directly defines only a first or primary cover and the apparatus further includes an auxiliary cover that can overlie or encompass entirely the base and primary cover. For example, the auxiliary cover could be formed of a cloth material to loosely lie over the top surface of the base, for example. Alternatively, it can be formed of a spandex material to fit snugly over the base and primary cover. In any event, the material and the pattern on the material of the auxiliary cover provide distinct advantages. Firstly, the cover can be made of a material having a pattern that has a unique association with the pet to be restrained by the apparatus. For example, the pattern could be that of the spots of a dalmatian or the obscure dark streaks and flecks on a tawny ground corresponding to the fur of a tabby cat. Alternatively, the pattern of the material can provide a thematic scene that might be appealing to a particular type of pet such as a pond of gold fish or flock of birds corresponding to a cat. For pet owners with more refined tastes, the material of the auxiliary cover could even correspond to the cover of a couch or chair so that the apparatus blends with the decor of an elegantly furnished living room or den. Thus, the auxiliary cover not only serves the function of an added protective covering over the base, but, perhaps more importantly, serves also to make the apparatus more palatable to the pet and less unsightly or obtrusive to the pet owner.

Additional elements can be incorporated along with a pet anchoring apparatus as already described to form a pet accommodating and restraining system for comfortably confining the movement of a pet within a preselected area for a predetermined period of time. In addition to the pet anchoring apparatus, the system can include a pet pad positioned adjacent the pet anchoring apparatus to function as a protective sheet over the area within which the pet is confined to protect the underlying surface from accidents and spills associated with the confinement of a pet for any length of time.

Moreover, the system can further incorporate a pet feeder to supply water and food to the pet during the period the pet is confined. Preferably, the pet feeder is positioned on the anchoring base, being formed as a concave surface portion that can hold food or water. Positioning the feeder on the base increases the efficiency of the system, making it easier to transport in the sense of having fewer separate pieces and posing less clutter within the area of the pet's confinement. In a similar sense, the system can be enhanced by providing a pet bed formed as an integral part of the protective pet pad.

Thus, the system and apparatus provided by the present invention provide a number of distinct advantages and benefits for confining a pet within a preselected area. As described, the present invention provides numerous advantages in the context of restraining a pet in a variety of settings. For example, the invention provides the capability for keeping a pet from straying from a selected outdoor site so that the pet is able to accompany the pet owner on a picnic or to the beach or to remain safely out of the way while the pet owner performs yard work around the house. Also, for example, the invention keeps an otherwise rambunctious pet from grabbing food off tables during an indoor party so that the pet does not have to be locked-up in a room removed from the party guests. Similarly, the invention provides advantages beyond restraining the pet to a confined area. For example, the invention can be used to restrain the pet during washing and grooming. So, too, the invention serves as a training device, for example, in the context of conditioning show dogs to remain in place during exhibitions and competition.

BRIEF DESCRIPTION OF THE DRAWINGS

Some of the features, advantages, and benefits of the present invention having been stated, others will become apparent as the description proceeds when taken in conjunction with the accompanying drawings in which:

FIG. 4 is a bottom perspective view of a pet anchoring apparatus according to an embodiment of the present invention;

FIG. 5 is a fragmentary exploded perspective view of a bottom portion of a pet anchoring apparatus according to an embodiment of the present invention;

FIG. 6 is a fragmentary side elevational view of a pet anchoring apparatus having portions thereof broken away for clarity according to the present invention;

FIG. 7 is a fragmentary perspective view of a handle of a pet anchoring apparatus having fingers of a person inserted therein according to an embodiment of the present invention;

FIG. 8 is a fragmentary perspective view of a handle of a pet anchoring apparatus having a paw of a dog overlying the handle according to an embodiment of the present invention;

FIG. 9 is an environmental view of a pet anchoring apparatus position on a side thereof to illustrate the difficulty in rolling or moving the apparatus according to an embodiment of the present invention;

FIG. 11 is an environmental perspective view of a pet anchoring apparatus illustrating a relatively small dog attached thereto according to an embodiment of the present invention;

FIG. 12 is an environmental perspective view of a pet anchoring apparatus illustrating a relatively medium size dog, or larger dog as compared to FIG. 11, attached thereto according to another embodiment of the present invention;

FIG. 13 is an environmental perspective view of a pet anchoring apparatus illustrating a relatively large size dog, or larger dog as compared to FIG. 12, attached thereto according to an additional embodiment of the present invention;

FIG. 22 is a perspective view of a pet anchoring apparatus according to an additional further embodiment of the present invention;

FIG. 23 is a perspective view of a pet anchoring apparatus according to yet an additional further embodiment of the present invention;

FIG. 24 is a perspective view of a pet anchoring apparatus according to still an additional further embodiment of the present invention; and FIG. 25 is a perspective view of a pet anchoring apparatus according to still another additional further embodiment of the present invention;

FIG. 26 is a perspective view of a pet anchoring apparatus according to still another additional further embodiment;

FIG. 27 is a fragmentary side elevational view of a pet anchoring apparatus having portions thereof broken away for clarity according to still another additional further embodiment of the present invention;

FIG. 28 is a perspective view of a pet accommodating and restraining system according to the present invention;

FIG. 29 is an exploded perspective view exposing a moisture absorbent layer and a moisture resistant bottom layer of a pet pad forming part of a pet accommodating and restraining system according to the present invention;

FIG. 30 is a side sectional view taken along line 30—30 of FIG. 28 of a pet pad forming part of a pet accommodating and restraining system according to the present invention;

FIG. 31 is a side sectional view taken along line 31—31 of FIG. 28 of a pet pad forming part of a pet accommodating and restraining system according to the present invention;

FIG. 32 is an environmental view of a pet accommodation and confinement kit in a separated-pieces mode according to the present invention;

FIG. 36 is a perspective view of elements of a puppy starter kit according to the present invention;

FIG. 37 is an additional perspective view of elements of a puppy starter kit according to the present invention;

FIG. 38 is yet a further perspective view of elements of a puppy starter kit according to the present invention; and FIG. 39 is a perspective view of a pet run effected using a pair of pet anchoring apparatuses according to the present invention

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art. Like numbers refer to like elements throughout, and prime, double prime, and triple prime notation, where used, generally indicate similar elements in alternative embodiments.

Figure 1:
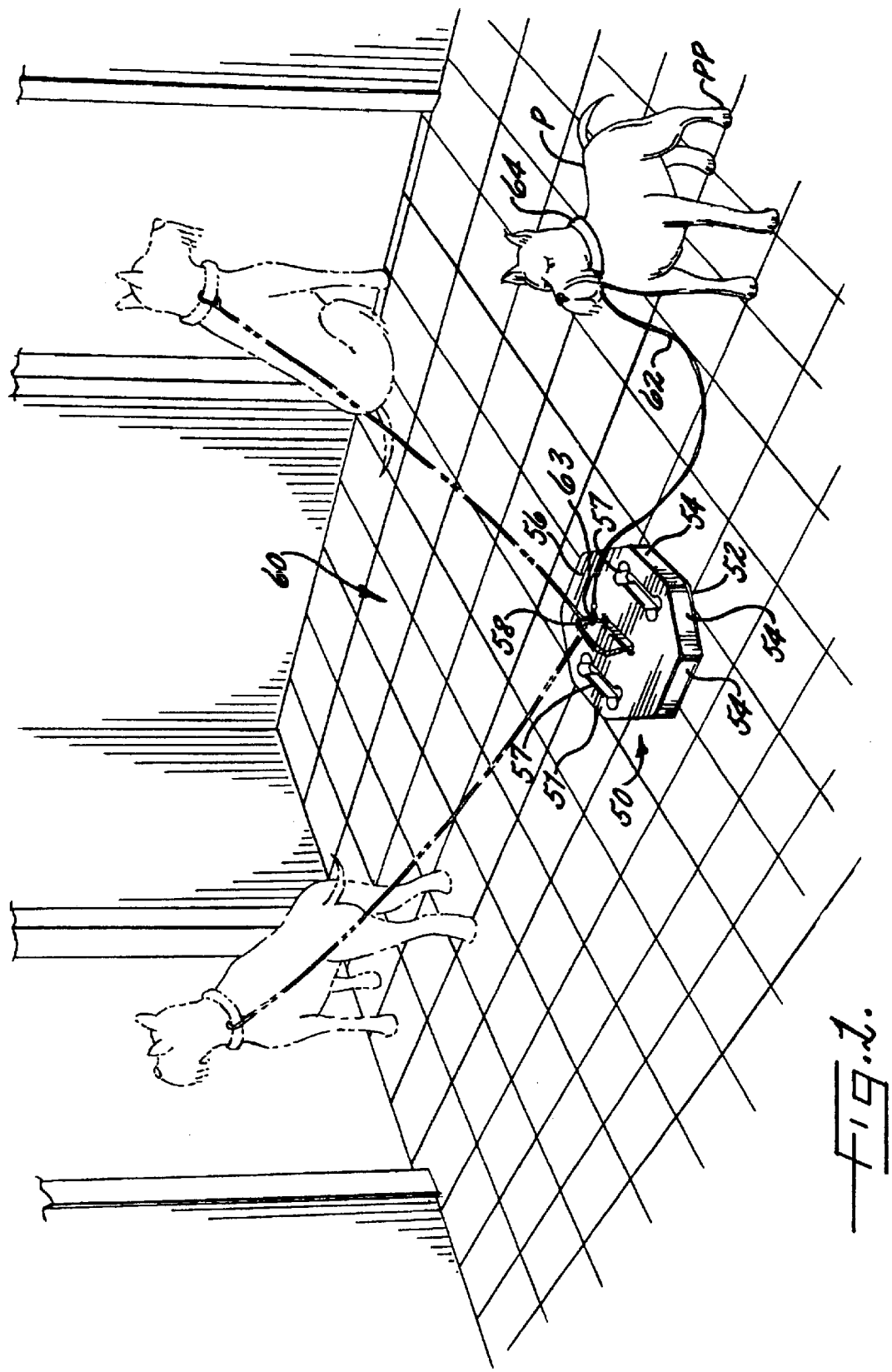
FIG. 1 is an environmental view of a pet anchoring apparatus according to an embodiment of the present invention.

FIG. 1 illustrates a first embodiment of a pet anchoring apparatus 60 for securing and restraining the movement of a pet P such as a dog within a preselected area. The pet anchoring apparatus preferably includes a base 50 and, positioned on the base, a restraining cord connector 58 for connecting a leash or other restraining cord 62, which in turn fastens to a pet collar 64, harness, muzzle, or to the pet directly. The base 50 preferably is formed of a substantially solid material. The base furthermore preferably has a substantially solid bottom surface 52, a plurality of substantially solid side wall surfaces 54 connected to and extending upwardly from the bottom surface 52, as well as a substantially solid top surface 56 connected to the plurality of side wall surfaces 54 and overlying the bottom surface 52. In addition, the plurality of side wall surfaces 54 preferably have a relatively low height so that in combination with the bottom surface 52 and top surface 56, each having a narrow thickness, the wall surfaces and the top surface 56 and bottom surface 52 substantially define the height of the base 50 such that the height of the base 50 is relatively low. For example, the height can be close to two and one-half inches or less, thus being relatively low in relation to a pet's paw or person's foot. The plurality of side wall surfaces 54 in combination, moreover, define a non-circular outer perimeter of the base 50. The weight of the base 50 is greater than that of a standard sized pet attached to the base 50; however, as described in detail below other embodiments of the present invention provides alternative ways for one to vary the weight of a pet anchoring base to accommodate different types of pets having varied weights.

The base 50 preferably has a cover 51 substantially surrounding at least the top portion of the base 50, with the cover 51 preferably contacting the base 50 and being formed of a softer material than the base 50. For example, the solid base 50 may be formed of concrete, metal, alloy, other solid material, or some combination of such materials as will be readily understood by one skilled in the art. The material of the cover 51 can be any material, but is preferably one that is softer than that of the base 50 itself. Thus, for example, the cover 51 can be made of a durable plastic formed to overlie at least a portion of the base surface. The material of the cover 51, alternatively, can be a synthetic rubber such as neoprene. Alternatively, the material of the cover 51 can be a synthetic fiber or fabric such as spandex made from a polymer containing polyurethane and having elastic stretch capabilities. Such materials provide a dual benefit. First they can be smooth to the touch while also having a relatively high friction coefficient. The latter feature provides definite advantages if two or more bases are arrayed adjacent one another in a vertical stack or horizontal array, so as to provide enhanced anchoring weight as described below. A high friction coefficient helps prevent two bases in contact with one another from slipping out of a stacked or arrayed position. Thus, for example, the material of the cover 51 can be an elasticized synthetic fiber such as spandex formed to fit relatively snugly over the entire base 50. In a first embodiment of the present invention, as illustrated in FIGS. 1, 2, 4 and 9, the cover 51 completely encases the solid material forming the base 50. A second benefit of the friction provided by the cover 51 is that, to the extent the cover 51 overlies a bottom surface portion of the base 50, the friction between the base 50 and the surface on which the base 50 is positioned helps prevent the base 50 from sliding or otherwise moving if the pet tugs against the restraining cord. The friction effect of the material of the cover 51 over the bottom surface portion of the base 50 enhances the restraining capacity of the base 50. Thus, any single anchoring base can accommodate a fairly broad range of different types of pets having varied sizes and weights.

Figure 2:
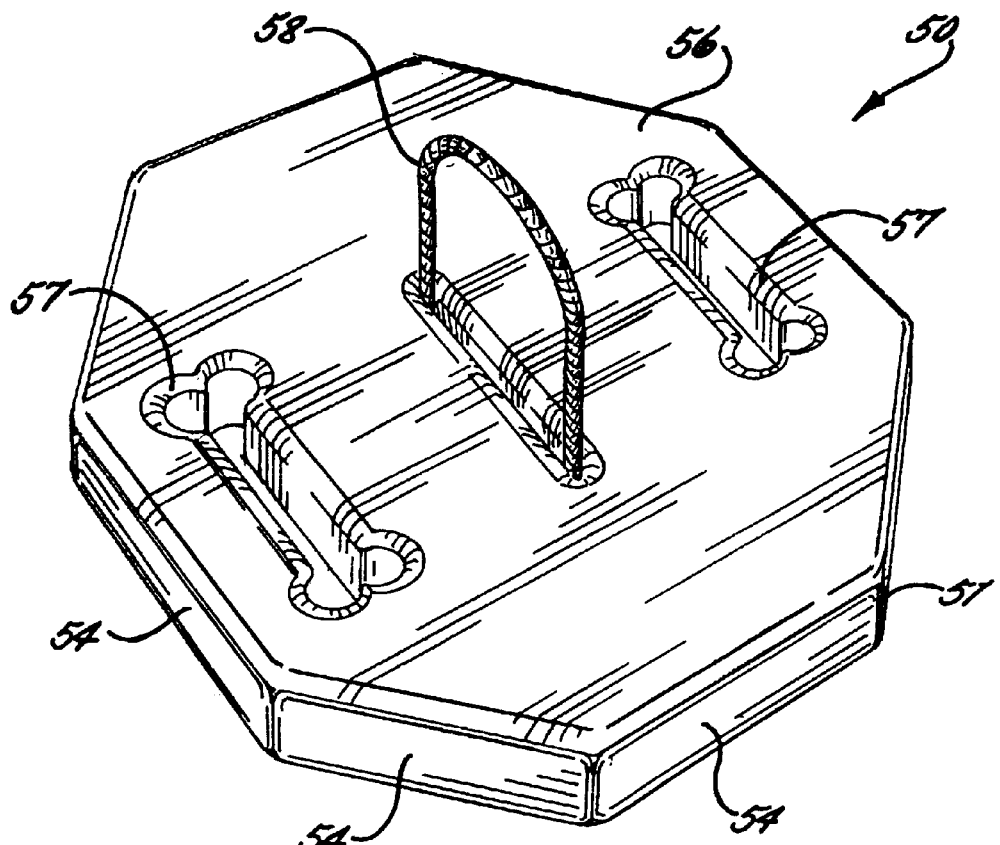
FIG. 2 is a perspective view of a pet anchoring apparatus according to an embodiment of the present invention.
Figure 3:
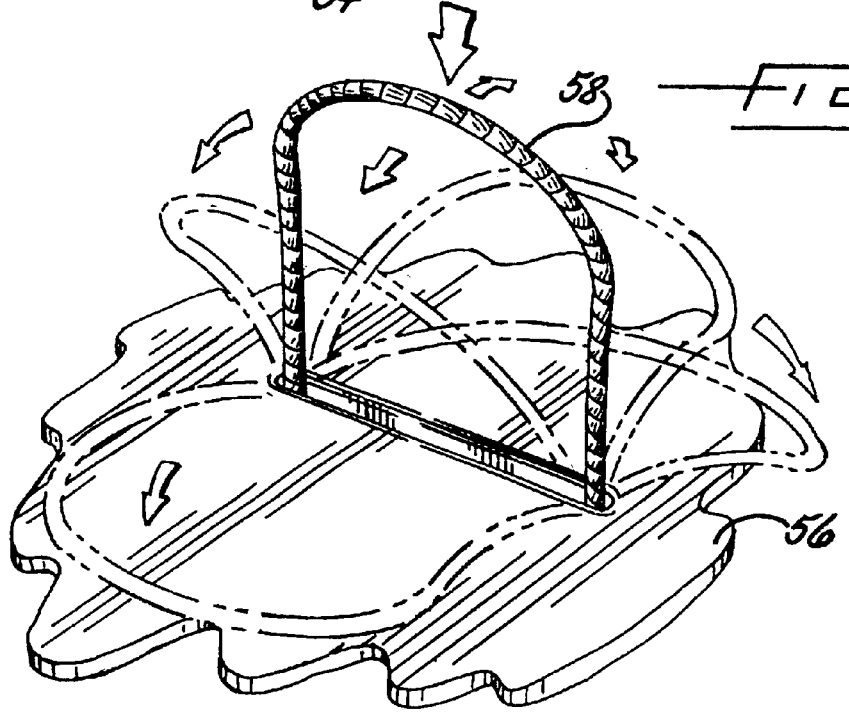
FIG. 3 is a fragmentary perspective view of an upper portion of a pet anchoring apparatus according to an embodiment of the present invention.

In addition, a cord connector is associated with the base, the connector providing a connection between the base and a restraining cord that in turn attaches to a pet collar, muzzle, harness or directly to the pet to thereby link the pet to the pet anchoring apparatus. As illustrated in FIGS. 1–3, the connection between the base 50 and restraining cord 62 can be effected with a flexible cord connector 58. The flexible cord connector 58 is illustrated as being positioned on the base 50. At least one restraining cord 62 having a preselected length and having an end portion thereof is connected to the flexible cord connector 58. As perhaps best illustrated in FIGS. 1 and 11–13, one end of the restraining cord 62 connects to a collar 64 on the pet P and the other end of the restraining cord 62 connects to the flexible cord connector 58 so as to secure the pet P to the base 50 and thereby restrain the movement of the pet P within a preselected area. The restraining cord 62 preferably includes at least one connecting device such as an eyelet 63 positioned at one end of the restraining cord 62 to connect the restraining cord 62 to the flexible cord connector 58. Preferably, the eyelet 63 is rotatably connected to the restraining cord 62 so that the eyelet is capable of a complete 360-degree swivel to thereby provide the greatest degree of freedom of movement for a pet P attached by the restraining cord 62 to the anchoring base 50.

In order to secure the flexible cord connector 58 to the base 50, the base 50 also has an opening 67 extending through a medial portion of the base 50, which in the first embodiment illustrated perhaps best in FIG. 1 is preferably substantially solid as already noted. The opening, moreover, is relatively wider at the initial opening on the bottom surface 52 of the base 50 and narrows as the opening extends upward through the medial portion in the direction toward the top surface 56 of the base 50. The opening 67 operates in conjunction with the flexible cord connector 58 when the flexible cord connector 58 includes a stop member 69 so that the stop member 69 restricts the flexible cord connector 58 at narrower portions of the opening 67 to prevent the flexible cord connector 58 from passing completely through the opening 167.

To increase the portability of the base so that it can easily be moved and positioned within any environment, the base preferably includes handles for lifting the base, and can further include shoulder straps to assist in carrying the base wherein the straps preferably can be detachably connected to the handles when the base is being carried and detached when the base is being used to restrain a pet (See FIG. 24). As will be understood by those skilled in the art, various types of handles can be included on or connected to the base.

As illustrated in FIGS. 1, 2, 4, and 7–9, however, the base 50 preferably includes a plurality of handles 57 formed in the substantially solid base 50.

As explicitly illustrated in FIGS. 7 and 8, each of the plurality of handles 57 is preferably formed by a narrowly recessed opening through the base 50, the opening being just narrow enough to make it difficult for a paw PP of a pet P to extend into the opening, and yet at the same time, remaining sufficiently open to permit fingers of a person H to extend into the opening to make it easy for the person to lift and carry the apparatus. Notwithstanding the distinct advantages of having a substantially solid top surface, there are countervailing advantages to alternatively providing substantially open handles that extend through the otherwise solid base, among these being that the base is accordingly easier to grip at the handles and easier to lift off of a substantially continuous flat surface on which the base is lying. In addition, the larger, open handles can accommodate a greater range of decorative formations in which to shape the particular handles. As specifically illustrated, each of the plurality of handles 57 preferably has a preselected shape associated with the type of pet to be restrained using the present invention. For example, as illustrated in FIGS. 1, 2, 4, 7–9, the handles 57 are in the shape of a dog bone. Other shapes, however, can include such patterns as a narrow fire hydrant for a dog or a fish bone for a cat, to mention just two examples.

The advantage of having the handles 57 formed as narrow openings is to prevent the handles from providing a space or interstice within which the pet P could entangle a paw PP causing the pet to stumble or get trapped therein as can occur, using a hub-and-spoke type apparatus. The further advantage of having each of the plurality of handles 57 formed within the base is to avoid having rigid extensions protruding from the base 50 which could trip the pet or a person walking near the base 50, possibly even impaling the pet or person. For similar reasons, the cord connector 58 is preferably flexible rather than rigid. Specifically, the flexible cord connector 58 is sufficiently pliable so as to bend or twist whenever the cord connector 58 contacts the pet or a person. Thus, instead of inflexibly protruding from the base 50 so as to obstruct the movement of a pet or person, or potentially impale the pet or person that comes in contact with the cord connector 58, the cord connector 58 flexes in response to contact with the pet or person. Alternatively, the cord connector can otherwise be associated with the anchoring base without being positioned directly on to the anchoring base. For example, FIG. 23 illustrates a cord connector not connected directly to the base 470. Instead, the cord connector is provided by a "D"-ring 475 connected to the end of a strap 479, which is, in turn, connected with the anchoring base 470. A restraining cord having one end attached to the pet is attached at the other end to the "D"-ring 475 to thereby restrain the pet. As is true for the flexible cord connector 58 described above, the "D"-ring 475 and the strap 479 to which it is attached avoid posing an obstruction to movements of the pet or a person. Indeed, the strap 479 lacks rigid form so that the strap 479 and connected "D"-ring 475 generally will lie limply over the base 470 unless pulled taut by the pet's moving to the outer perimeter of the area of confinement and straining against the connected restraining cord. Thus, like the flexible cord connector 58, the strap 479 and "D"-ring 475, defining a cord connector, not only avoid posing as an obstruction to movement but also avoid being a rigid extension that might impale the pet or a person.

In a similar vein, the top surface 56 of the base 50 preferably is substantially flat to thereby operate in conjunction with the flexible cord connector 58 to thereby avoid having potentially impaling obstructions otherwise extending from the base 50. Thus, the top surface 56 of the base 50 preferably provides substantially flat and substantially continuously solid surfaces to thereby reduce the likelihood that a paw PP of a pet P or foot of a person will be entangled within the base to thereby lessen the risk that the pet or person will stumble over the base. Alternatively, there are distinct advantages to having substantially open portions extending through the base. For example, as already noted, the substantially open portions can provide more easily gripped handles or allow for more creative latitude in forming the handles so that the handles decoratively correspond to the pet to be restrained by the pet anchoring apparatus. Whatever the motivation for providing substantially open portions extending through the otherwise solid base may be, the present invention can accommodate the openings while retaining the attribute of reducing the likelihood that a paw PP of a pet P or foot of a person will be entangled within the base. Specifically, this simultaneous accommodation of substantially open portions on the base while also lessening the risk that the pet or person will stumble over the base can be accomplished by making the height of the base sufficiently low. As described above, the plurality of side wall surfaces 54 preferably have a relatively low height so that in combination with the bottom surface 52 and top surface 56, each having a narrow thickness, the wall surfaces and the top surface 56 and bottom surface 52 substantially define the height of the base 50 such that the height of the base 50 is relatively low. Thus, if the height of the base 50 is sufficiently low, the base 50 will accommodate substantially open portions without significantly increasing the risk that a paw PP of a pet P or foot of a person will be entangled within the base. The reason, of course, is that the open portions extending through a low lying base 50 do not have substantial depth. Therefore, even if a person steps into the opening or the pet P does place its paw PP within the opening, the lowness of the base 50 reduces the likelihood that the pet P or person will trip over the low vertical wall formed in the base by the opening extending therethrough.

Figure 10:
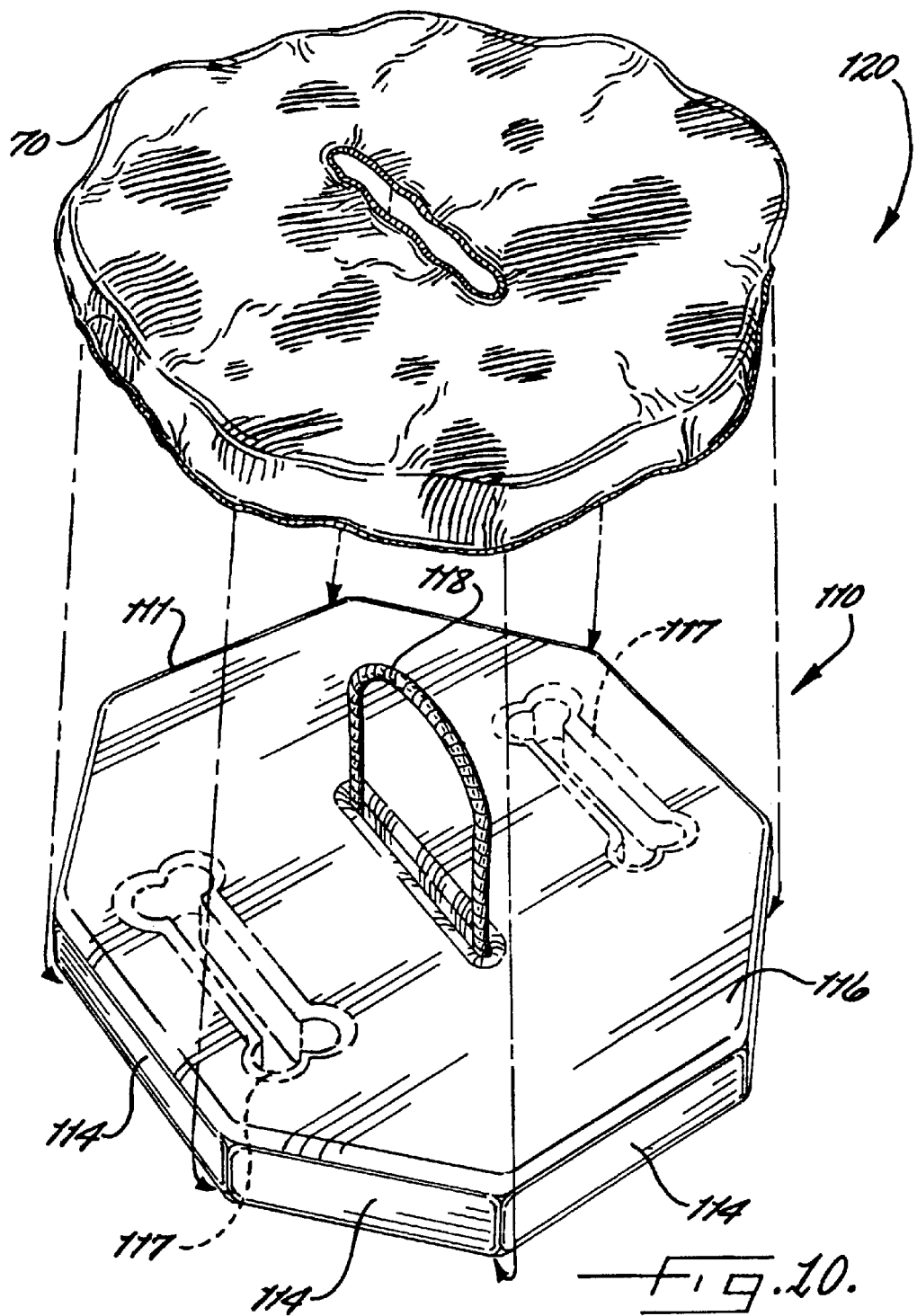
FIG. 10 is an exploded perspective view of a pet anchoring apparatus having a patterned cover to be positioned thereon according to an embodiment of the present invention.

FIG. 10 illustrates a second embodiment of a pet anchoring apparatus 120 in which the base cover defines a primary cover 111 and an additional cover defining an auxiliary cover 70 is provided to fit over the primary cover 111 and the base 110. Preferably, the auxiliary cover 70 is made of a soil resistant material. The auxiliary cover 70 can lie, partially or completely, loosely or snugly, atop or over the base 110 and over one or more handles 117. Thus, the auxiliary cover 70 can be formed for example, from a soft cloth material and lie loosely over the top surface 1 16 of the base I 10, covering or not covering any portion of the side surfaces 114 or the connector 118 thereof. Alternatively, the auxiliary cover 70 can be formed of a stretchable spandex material so as to fit snugly over the entire base 110 and primary cover 111. Moreover, the material of the auxiliary cover 70 has a preselected pattern that is associated with the type of pet to be restrained by the apparatus 120. As illustrated in FIG. 10, for example, the pattern could be that of the spots of a dalmatian breed of dog. Other patterns spring to mind, however, such as a pattern of black, brown, and white corresponding to the tricolored coat of a beagle or a pattern of obscure dark streaks and flecks on a gray or tawny ground corresponding to the fur of a tabby cat. Alternatively, the pattern of the material can provide a thematic scene that might be appealing to a particular type of pet such as a pond of gold fish or flock of birds corresponding to a cat. Alternatively, the cover can carry patterns corresponding to corporate or organizational logos. For those having more refined and sophisticated tastes, the material of the auxiliary cover 70 could even correspond to the cover of a couch or chair so that the apparatus 120 blends with the decor of an elegantly furnished living room or den. Thus, the auxiliary cover 70 not only serves the function of an added protective covering for the base 110, but, perhaps more importantly, serves also to make the apparatus 120 more palatable to the pet restrained by the apparatus 120 and less obtrusive to the pet owner.

FIGS. 11–13 illustrate yet a third embodiment of a pet anchoring apparatus 180 for securing and restraining the movement of a pet within a preselected area. In this embodiment, the combination of a substantially solid base and cover define a first anchoring base 170, while the apparatus 180 further includes a second anchoring base 190 positioned to overlie the first anchoring base 170 so that a bottom surface 192 of the second anchoring base 190 contacts the top surface 176 of the first anchoring base 170 to thereby define a stacked position and to thereby change the weight of the pet anchoring apparatus 180 in proportion with the weight of the pet that is to be restrained by the apparatus 180. Preferably, the second anchoring base 190 also has a connector opening extending therethrough so that the flexible cord connector 178 extends through both the first and second anchoring bases. Thus, the flexible cord connector 178 serves also to secure the anchoring bases in a stacked position. The weight of the second anchoring base 190 atop the first anchoring base 170 as well as the surface friction generated by the material of the base covers 171, 191 further serves to keep the combined anchoring base 170, 190 stably positioned in a stack. Other means for positioning the anchoring bases 170, 190 in a stacked position are possible, however. For example, with respect to a first and a second anchoring base, the latter positioned atop the former, at least one flanged portion along the bottom surface of the second base could be provided to fit within a channel or groove provided on the top surface of the first base to thereby secure the bases in a stacked position.

Figure 35:
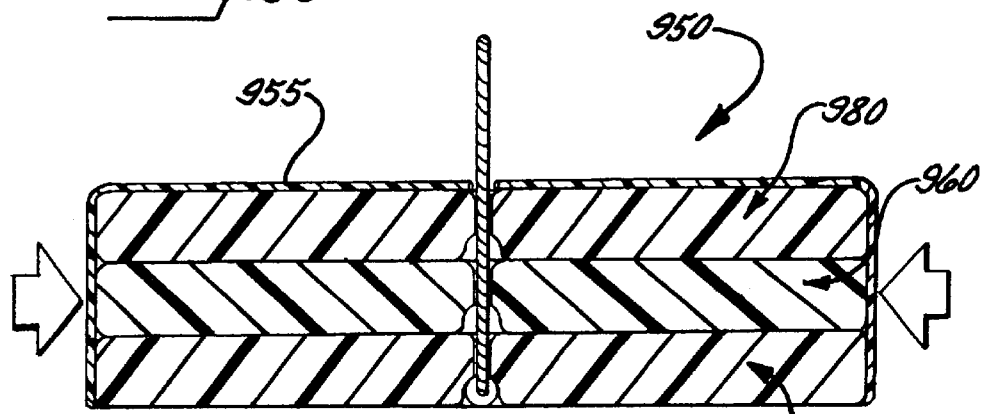
FIG. 35 is a vertical sectional view taken along line 35—35 of FIG. 34 of a pet anchoring apparatus according to the present invention.
Figure 34:
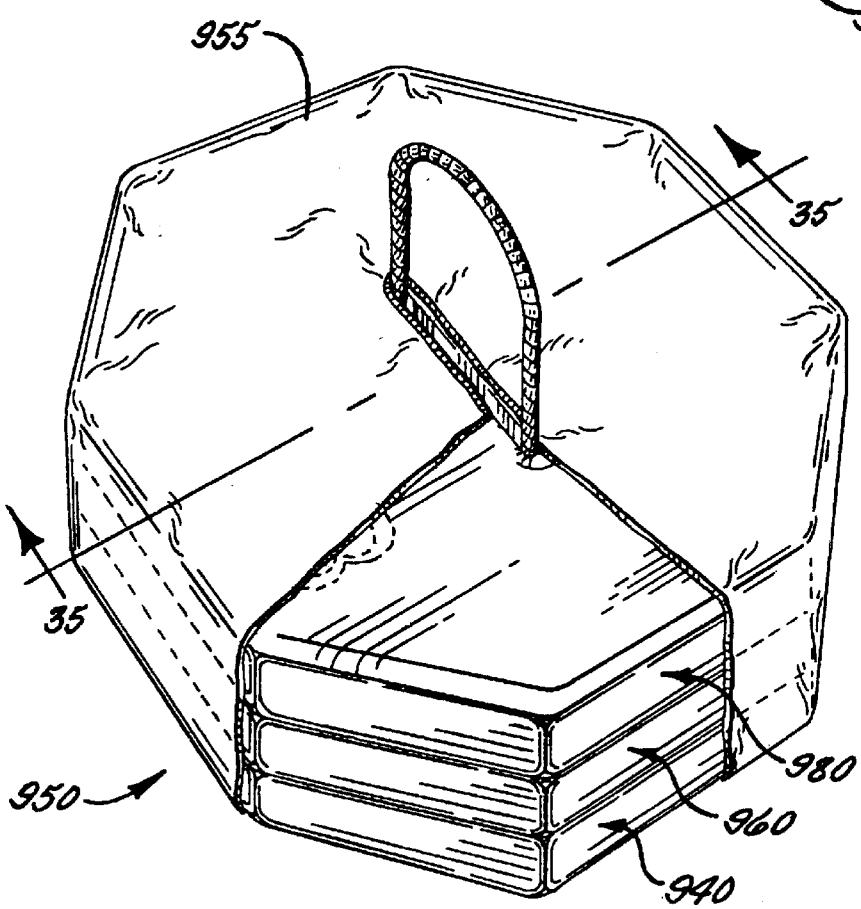
FIG. 34 is a perspective view of yet a further additional embodiment of a pet anchoring apparatus according to the present invention.

Alternatively, separate, individual clips connected, for example, along the sides of the base pair could be used to couple the second base to the first base in a stacked position. Still further, a base cover as described above can also be used to help stabilize a plurality of anchoring bases in a stacked position wherein the cover fits over the several anchoring bases with sufficient snugness to help prevent any one of the bases from slipping out of position in the stack. As illustrated in FIGS. 34–35, for example, the pet anchoring apparatus 950 can comprise a plurality of anchoring bases 940, 960, 980, positioned in a vertical stack and over which a cover 955 substantially extends with sufficient snugness to prevent each of the anchoring bases 940, 960, 980 from slipping out of the vertical position. Other means for connecting the separate anchoring bases will be readily apparent to one skilled in the art. The height of the anchoring apparatus 180 can also be increased by adding at least a second base 190, and, as needed, one or more additional supplemental anchoring bases 210 to a first base 170 in a vertical array (FIGS. 11–13).

An added function of the base is to provide a convenient device for a pet feeder (See FIG. 26). Thus, the pet anchoring base 650 can further comprise at least one relatively shallow concave surface portion, defining a pet feeder 670, formed in the top surface 656 of the base to alternatively hold water and food in a position accessible to the pet when the pet is restrained by the base 650 as well as one or more handles 657 and a connector 658 if desired. By positioning a water and/food dish on the base itself, there is an avoidance of an extra apparatus that can be misplaced if one wishes to travel with the pet and use the pet anchoring apparatus at different locations. This use of the base 650, which can also include a bottom surface 652 and one or more side walls 654, provides the advantage that the pet feeder, given the weight of the base 650, is less likely to be turned over spilling the contents or be tossed about by the pet. Furthermore the shape of the feeder positioned as it is on the base makes it less of an obstacle over which the pet or a human might trip, especially when the pet is confined within an area of relatively limited space. Preferably, the outermost perimeter of the concave surface portion formed in the top surface of the base has a preselected shape associated with the type of pet to be restrained by the apparatus. might trip, especially when the pet is confined within an area of relatively limited space. Preferably, the outermost perimeter of the convex surface portion formed in the top surface of the base has a preselected shape associated with the type of pet to be restrained by the apparatus.

In the context of an anchoring apparatus having a pet feeder 670 positioned on the base 650 (FIG. 26) as described above, increasing the height as well as the weight of the anchoring apparatus offers certain advantages. The additional height of the vertically stacked anchoring base can accommodate a larger sized pet by permitting the feeder to be positioned at a height that more closely corresponds to the height of the pet. By providing the pet easier access to the feeder, there is less chance for spills associated with pet feeding. Moreover, some studies suggest that an animal's health is improved by its consuming food and water with its head substantially upright so as to reduce air intake that occurs when the pet feeds with its head bent downward as when the feeder is positioned on the floor. Alternatively, of course, whether the pet feeder is positioned on the pet anchoring apparatus or independently from the pet anchoring apparatus, the height of the feeder can be increased using, for example, spacers positioned between the feeder and the surface of the base or the floor above which the feeder is positioned. In any event, adding height to the anchoring base can provide distinct advantages apart from increasing the restraining weight of the base.

More generally, the present invention provides a combination anchoring base in which any desired number of auxiliary anchoring bases are positioned adjacent a primary anchoring base, preferably in a stacked position. As illustrated in FIG. 13, the stack may be extended at will with a plurality of stacked anchoring bases 170, 190, 210 capable of forming a stack of virtually any weight desired by positioning one member on top of another. The stack formed of a plurality of stacked anchoring bases 170, 190, 210 thus includes at least a primary base 170 to underlie at least one other auxiliary base to thereby form a base of the stack as well as at least one auxiliary base 210 to overlie at least one other anchoring base, the top surface 216 of the top anchoring base thereby defining the top surface of the stack. As illustrated in FIGS. 11–13, each stacked anchoring base 170, 190, 210 preferably has a bottom surface 172, 192, 212 a plurality of side wall surfaces 174, 194, 214 connected to and extending upwardly from the bottom surface, and a top surface 176, 196, 216 connected to the plurality of side wall surfaces 174, 194, 214 and overlying the bottom surface 172, 192, 212. Preferably, at least one flexible cord connector 178 is connected to only one of the stacked anchoring bases, and at least one restraining cord 182 having a preselected length and having an end portion thereof connected to at least one flexible cord connector 184 to secure a pet P thereto, thereby restraining the movement of the pet P within a preselected area. The stability of the stacked position is enhanced if the friction coefficient of the base covers 171, 191, 211 has a sufficient magnitude to reduce slippage between any pair of members linked vertically or horizontally to one another. For example, if a force F is applied at the cord connector when the pet P tugs on the restraining cord, the friction f of the contact between the separate base covers reduces the likelihood that a base in a vertical stack to which the restraining cord is connected will slip or be pulled away from the stack (see FIG. 27).

The stacked position for the plurality of anchoring bases provides certain distinct advantages in that less surface of the area of confinement of the pet is taken up by the pet anchoring apparatus. Nonetheless, if one wishes to avoid adding height to the pet anchoring apparatus, then the plurality of anchoring bases can be linked one to another in a horizontal array. Alternatively, then, substantially the same result is achieved with a separate fifth embodiment of the present invention in which the members are connected to one another without stacking but rather by linking them in a horizontal array, perhaps coupling any pair of anchoring bases together with clips, ties, or other devices as will be readily apparent to one skilled in the art. In either embodiment, whether the bases are positioned in a vertical stack or a horizontal array, base pairs that a buttingly contact will be more stably positioned if the base covers have a high coefficient of friction as noted above. Certain distinct advantages are obtained, however, if two or more anchoring bases are arrayed horizontally yet spaced apart from one another. Specifically, one can effect a pet "run" 890, as illustrated in FIG. 39, by positioning two spaced-apart anchoring bases 880 connecting them with a linking cord 998, such as to respective connectors 888, 996, to which is slidably connected a pet restraining cord 892, which in the manner earlier described, attaches to a pet collar, harness, or the pet directly to restrain the pet to the apparatus 890. As pet moves between the two anchoring bases, a restraining cord slidably attached to the link between the two bases moves with the pet. The pet is thereby restrained on the path, but has complete freedom of movement within the path between the two spaced-apart anchoring bases.

Figure 14:
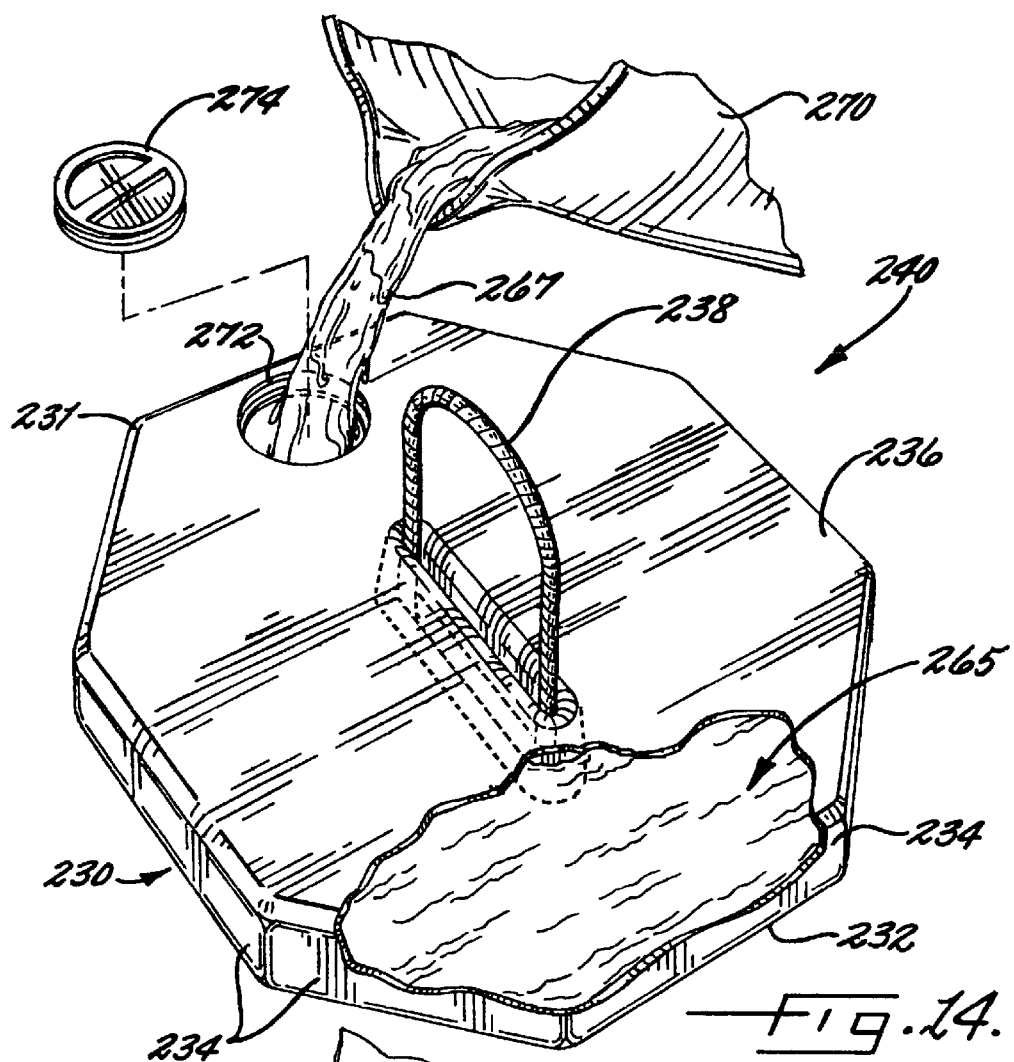
FIG. 14 is an exploded perspective view of a pet anchoring apparatus being filled with a liquid material according to yet another embodiment of the present invention.
Figure 15:
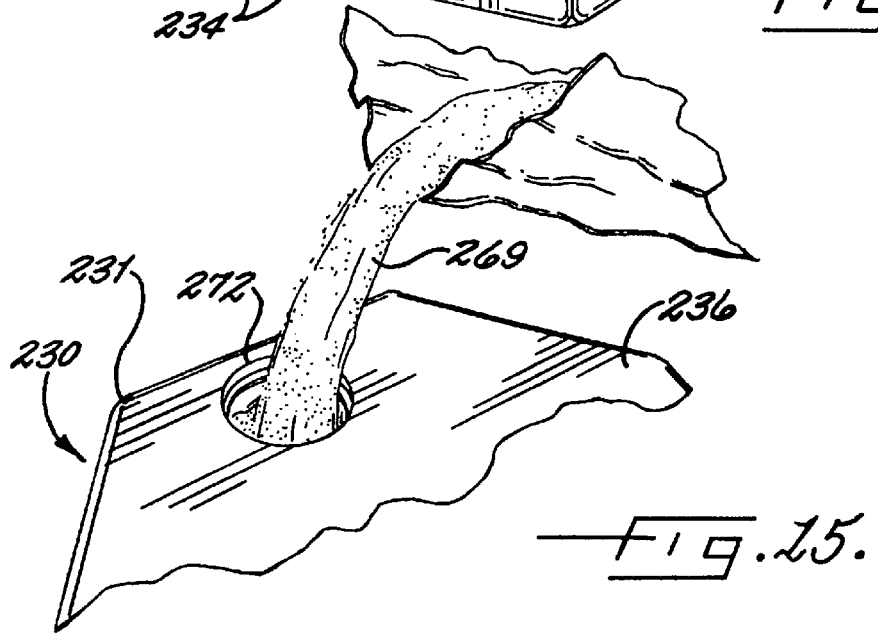
FIG. 15 is an exploded perspective view of a pet anchoring apparatus being filled with a particulate material according to still another embodiment of the present invention.

FIGS. 14 and 15 illustrate yet a fourth embodiment of the present invention in which the weight of the base 230 of the pet anchoring apparatus 240 also having a primary cover 231 can be increased as desired by filling an inner cavity 265 positioned within the base 230 with either a liquid 267 such as water or particulate matter 269 such as sand to thereby provide extra weight to the base 230. Conversely, of course, the liquid 267 or particulate matter 269 can be discharged from the inner cavity 265 to reduce the weight of the base 230 of the pet anchoring apparatus 240. Thus, the base 230 is highly portable and very easy to use. If one desires to confine a pet, for example, within a kitchen area, the base 230 can be filled with water from the faucet directly or first positioned and then filled with water dispensed from a pitcher 270 (see FIG. 14). Then, just as easily, if one wishes to transport the base so as to restrain the pet within an area at a recreational beach or other outdoor location, the base 230 can be emptied and easily transported to the new location where it is again filled with liquid or particulate matter to increase its weight for restraining the pet within the new area. The liquid 267 or particulate matter 269 is easily received into and discharged from the inner cavity 265 of the base 230 through an opening 272 that can be sealed using a detachable cap 274 or by other means as will be readily understood by those skilled in the art. The opening 272, moreover, can be conveniently positioned either on the bottom surface 232 of the base 230, on a side surface 234 of the base 230, or the top surface 236 of the base 230.

Thus, this fourth embodiment of a pet anchoring apparatus for securing and restraining the movement of a pet within a preselected area has a bottom surface 232, side wall surfaces 234 connected to and extending upwardly from the bottom surface 232, a top surface 236 connected to the plurality of side wall surfaces and overlying the bottom surface, and an inner cavity 265 enclosed between the bottom, top, and side surfaces of the base 230 to intermittently receive, store, and discharge liquid 267 and particulate matter 269 to thereby increase and decrease the weight of the base as desired. Preferably, again, each of the plurality of side wall surfaces 234 has a relatively low height and in combination with the thickness of the bottom surface 232 and the thickness of the top surface 236, both preferably relatively narrow, substantially defines the height of the base such that the height of the base is accordingly relatively low. Also, again, as illustrated in FIG. 14 the base 230 includes a flexible cord connector 238, preferably positioned on the top surface 236 of the base 230, to which can be connected at least one restraining cord for securing a pet to the base 230 to thereby restrain the movement of the pet within a preselected area.

Preferably, the base 230 further includes a substantially solid portion also positioned between the surface portions 232, 234, 236 of the base and adjacent the inner cavity 265. Extending through the base 230 from the bottom surface 232 to the top surface 236, moreover, is a cord connector opening extending through a medial portion of the solid portion of the base 230 and formed so that the cord connector opening is wider nearer the bottom surface 232 and narrows as the cord connector opening advances into the base 230 toward the top surface 236 of the base. If, then, the flexible cord connector 238 includes a stop member and extends through the cord connector opening in the solid base 230, the stop member operates to restrict the flexible cord connector 238 at narrower portions of the cord connector opening to prevent the flexible cord connector 238 from passing completely through the opening in the base 230 as described above in the context of the first embodiment of the invention.

Figure 16:
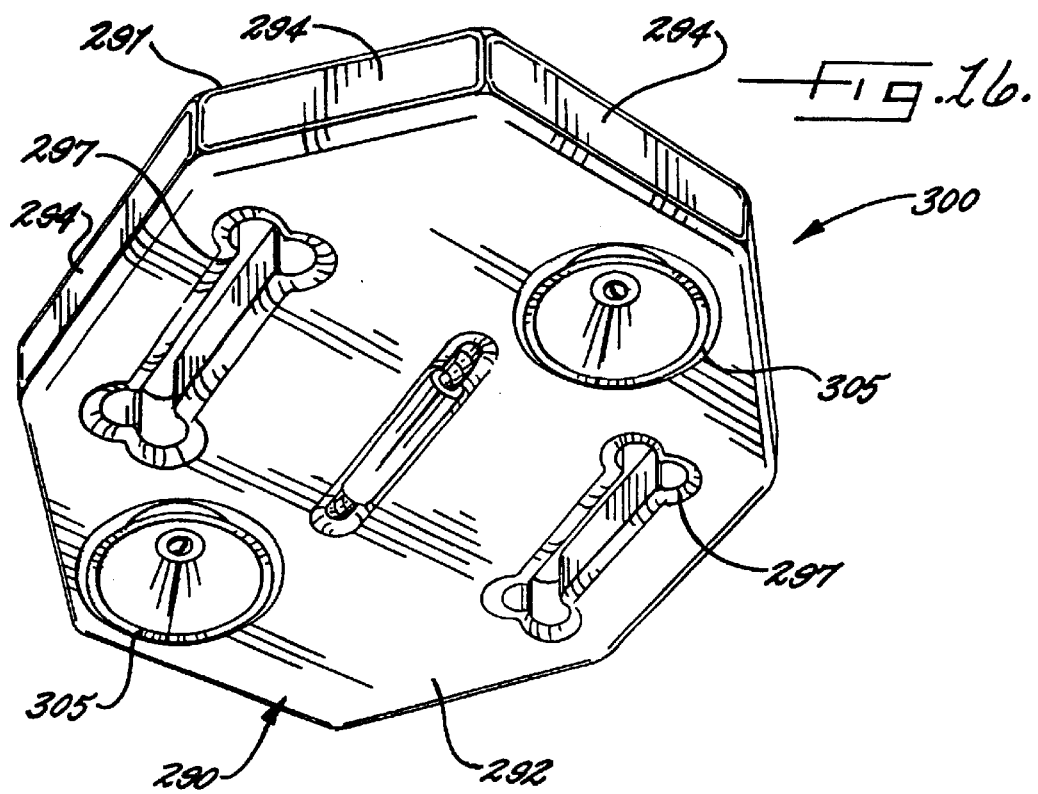
FIG. 16 is a bottom perspective view of a pet anchoring apparatus according to a further embodiment of the present invention.
Figure 17:
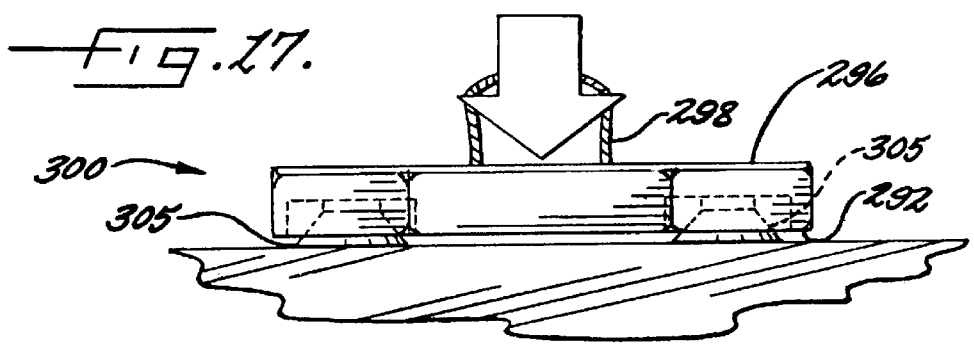
FIG. 17 is a side elevational view of a pet anchoring apparatus in a first position according to the further embodiment of the present invention.
Figure 18:
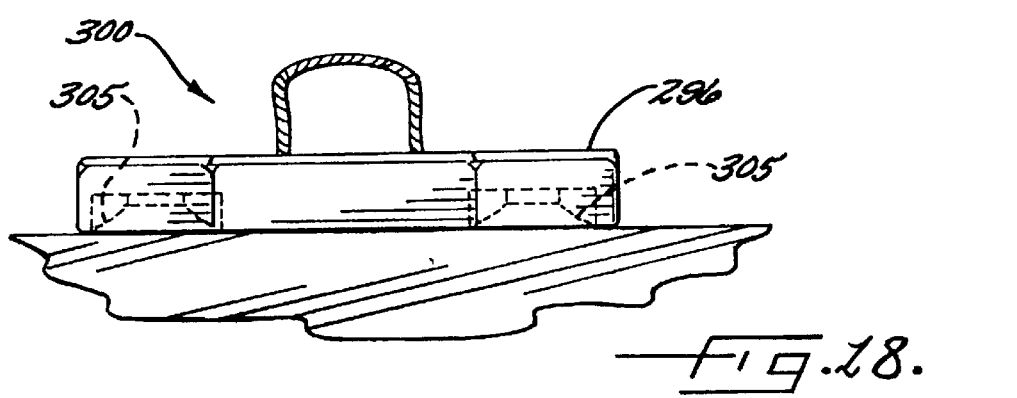
FIG. 18 is a side elevational view of a pet anchoring apparatus in a second position according to the further embodiment of the present invention.
Figure 19:
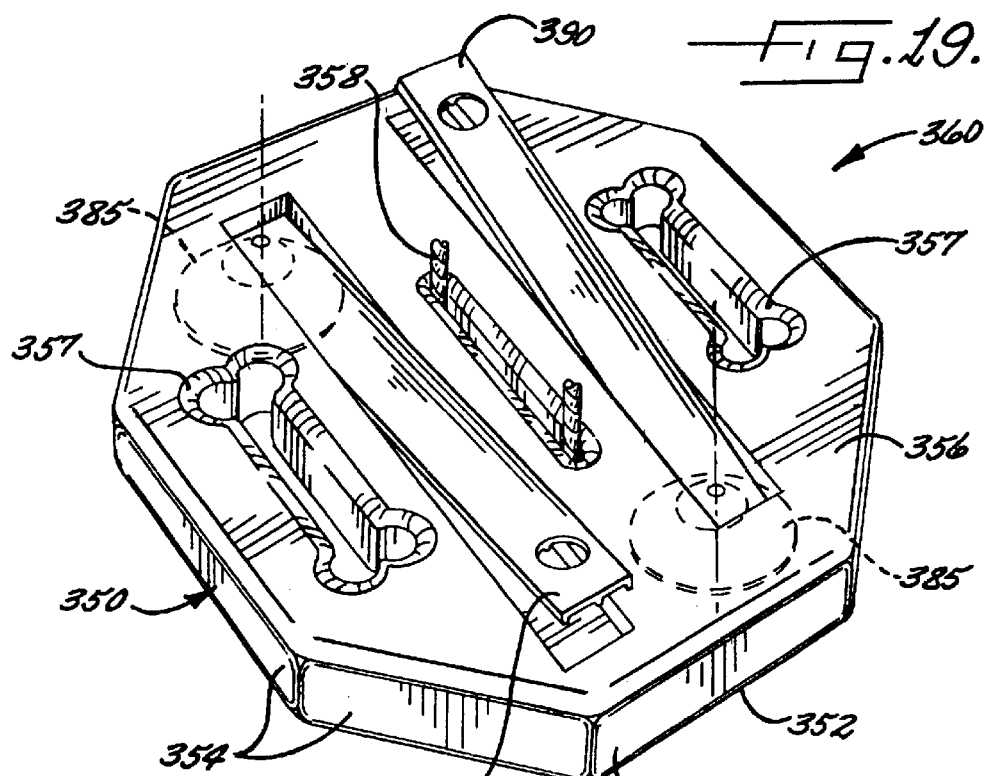
FIG. 19 is a top perspective view of a pet anchoring apparatus according to still a further embodiment of the present invention.
Figure 20:
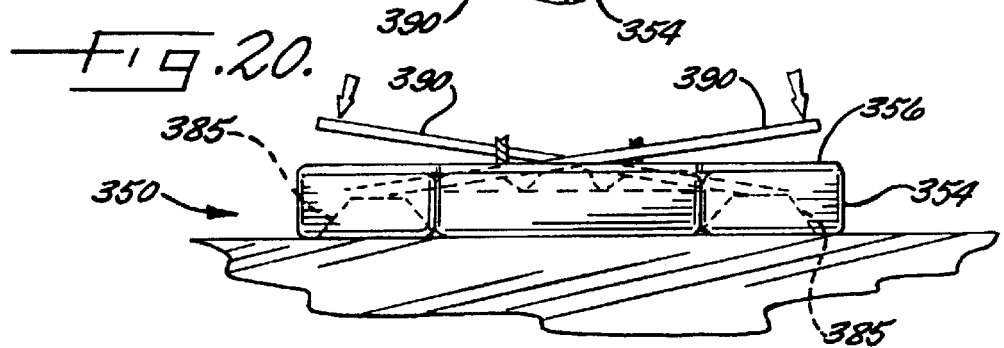
FIG. 20 is a side elevational view of a pet anchoring apparatus in a first position according to the still further embodiment of the present invention.
Figure 21:
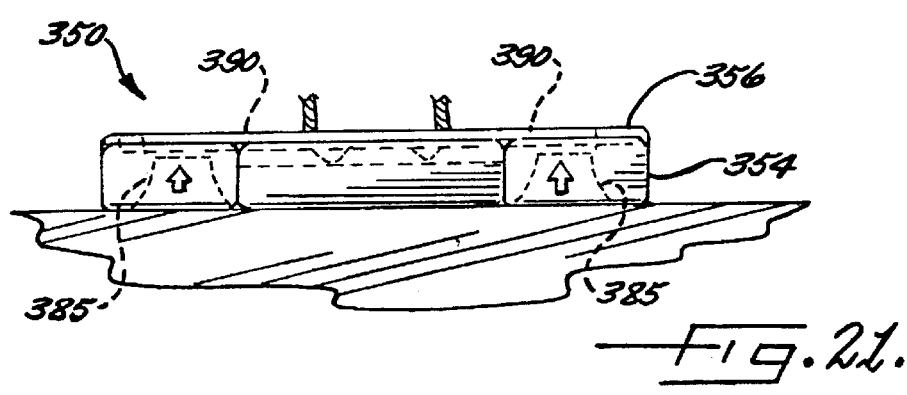
FIG. 21 is a side elevational view of a pet anchoring apparatus in a second position according to the still further embodiment of the present invention.

FIGS. 16–18 illustrate a fifth embodiment of a pet anchoring apparatus 300 in which the restraining capacity of the anchoring base 290 is enhanced by the addition of suction devices 305 that can be positioned on the bottom surface 292 of the base 290. The base 290 includes one or more sidewalls 294, one or more handles 297, a primary cover 291, and a top 296. The apparatus 300 can also include a connector 298 as illustrated. As illustrated, the suction devices 305 are provided by inverted cups, but many other suction devices for accomplishing the same function can be readily envisioned by those skilled in the art. FIGS. 19–21, for example, illustrate a sixth embodiment of a pet anchoring apparatus 360 in which suctioning devices 385 are again included as part of an anchoring base 350 to enhance the restraining capacity of the base 350 accordingly. As illustrated, however, the suction devices 385 are augmented by levers 390 positioned within the base 350 that can be used to engage and disengage the suctioning devices 385 as will be readily apparent to one skilled in the art. Preferably, as illustrated, the levers 390 for engaging and disengaging the suctioning devices 385 are positioned near the top surface 356 of the base 350 to provide easy access for one positioning the base 350 in place or removing it for storage or transport for use at another location. As can be seen, the base 350 also includes a bottom surface 352, one or more sidewalls 354, and one or more handles 357. The apparatus can also include a connector 358 as well.

Various features of the pet anchoring apparatus 60, 120, 180, 240, 300, 360 as already described prevent the anchoring base 50, 110, 170, 230, 290, 350 from moving under a force applied by the pet while the pet is being restrained by the apparatus. Nonetheless, if for any reason the base 50, 110, 170, 230, 290, 350 is upended, an added feature the pet anchoring apparatus 60, 120, 180, 240, 300, 360 shape of the outer perimeter of the base 50, 110, 170, 230, 290, 350. Specifically, the outer perimeter of the base 50, 110, 170, 230, 290, 350 is noncircular, having at least a portion being straight-edged or irregular in shape so as to prevent the base 50, 110, 170, 230, 290, 350 from rolling if for any reason it is upended and lying on its side. Thus, for example, FIG. 22 illustrates a seventh embodiment of the pet anchoring apparatus 420 in which the anchoring base .410 has a diamond-shaped perimeter for first and second base portion layers as illustrated. The second base portion also includes a bottom surface 412, one or more sidewalls 414, and a top surface 416. The apparatus 420 can also include one or more handles 417, a connector 418, and a stop member 429 as illustrated. Similarly, FIG. 23 illustrates an eighth embodiment of a pet anchoring apparatus 480 that includes a, dog-bone-shaped base 470 having a bottom surface 472, one ore more sidewalls 474, and a top surface 476 a and includes one or more handles 477 as well. As noted above, FIG. 23 further illustrates a strap 479 having a first end extending into the base 470 and second end connected with a "D"-ring 475, the strap 479 and "D"-ring defining a cord connector. FIG. 24 illustrates a ninth. embodiment in which the base 530 of the pet anchoring apparatus 540 has a triangular shape and also includes a cover 531, a bottom surface 532, one or more sidewalls 534, and a top surface 536. FIG. 24 further illustrates straps 533 connected to the base 530 so that one can more easily carry the base 530 as well as one or more handles 537 and a connector 538. FIG. 25, illustrates a pet anchoring apparatus 600 having a square shaped anchoring base 590 also including a cover 591, a bottom surface 592, sidewalls 594, and a top surface. 596. FIG. 25 further illustrates an eyelet 603 attached to the end of a restraining cord 602 as described above, the eyelet 603 being capable of completely swivelling through a 360-degree range, and one or more handles 597 as well.

Additional elements can be incorporated with a pet anchoring apparatus as already described to form a pet accommodating and restraining system 780 for comfortably confining the movement of a pet P within a preselected area for a predetermined period of time. In addition to the pet anchoring apparatus 770, the system preferably includes a pet pad 792 which can be positioned adjacent the pet anchoring apparatus 770 to function as a protective sheet over the area within which the pet is confined to protect the underlying surface from accidents and spills associated with the confinement of a pet for any length of time. Thus, for example, the pet pad may have a plastic bottom layer 798 over which a moisture absorbent layer 800 is positioned as will be familiar to those skilled in the art and illustrated in FIGS. 29 and 30. Moreover, the pet pad preferably also includes at least a portion having a thickness and pliability of a pillow 802 to serve as a bed for the pet. The system preferably includes, moreover, a pet feeder positioned 4 Proadjacent the pet pad to store food and water in a position accessible to the pet. As described above in the context of another embodiment of pet anchoring apparatus, the pet feed can conveniently be formed in the pet anchoring base so as to provide less individual items to carry when transferring the system to a new location as well as to provide a secure base for the pet feeder to reduce the chances that the feed will be upended by the movement of the pet within the area of confinement.

Figure 33:
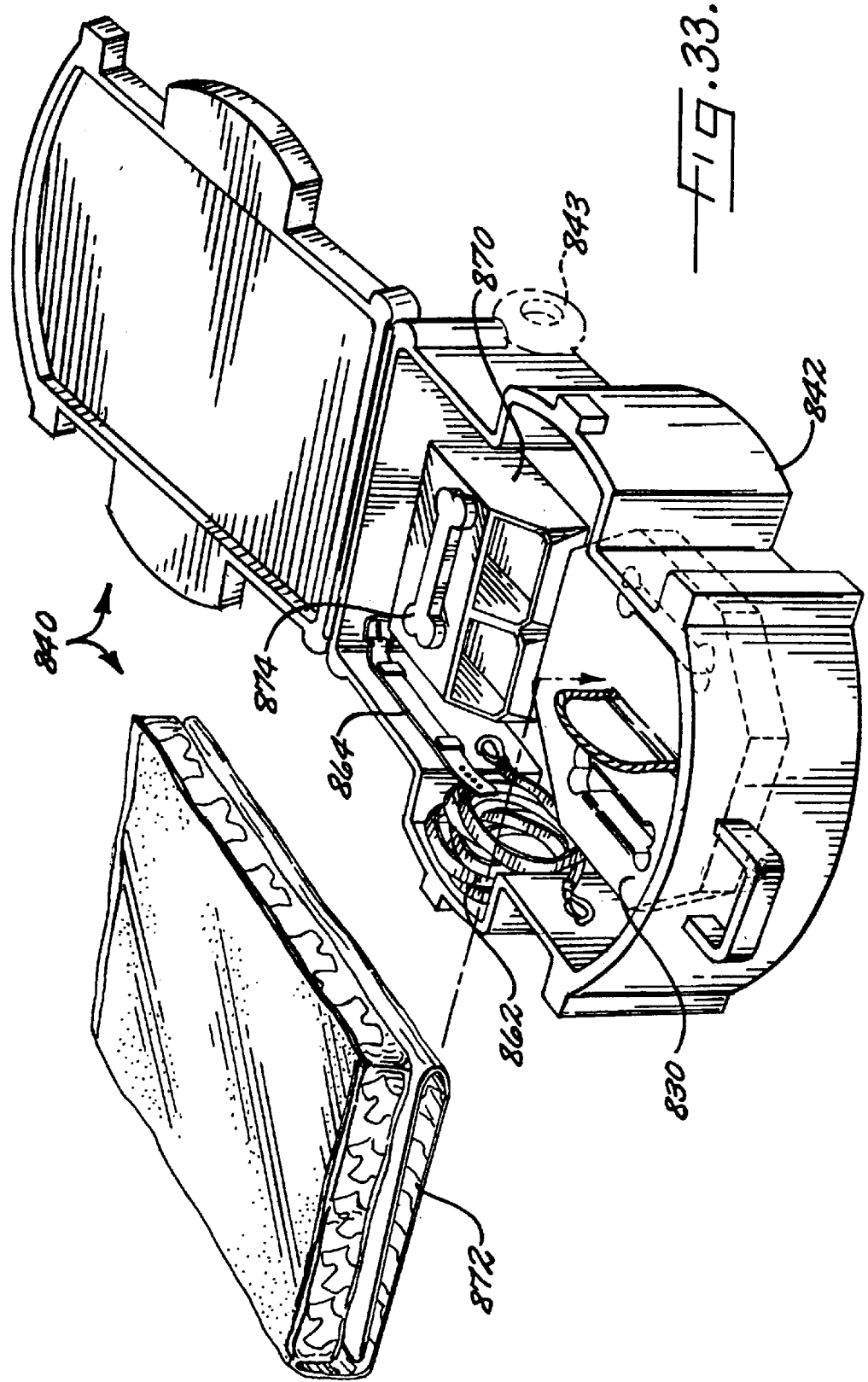
FIG. 33 is a perspective view of a pet accommodation and confinement kit in a containerized mode according to the present invention.

The present invention, moreover, provides a pet accommodation and confinement kit 840 for comfortably confining the movement of a pet within a preselected area for a predetermined period of time. The kit according to the present invention has a container 842 preferably containing at least a pet pad 872 which can also include a pillow 882 substantially as described above, and a pet anchoring apparatus 830 also as described above in the context of several distinct embodiments (see FIGS. 32–33). A pet accommodation and confinement kit 840 according to the present invention can also include a pet feeder 870 for storing and dispensing food and water to a confined pet contained within the container. Also according to the present invention, a pet accommodation and confinement kit 840 can also include a pet toy 874 contained within the container for providing amusement for the confined pet. The pet accommodation and confinement kit 840 further can includea pet blanket 876 and one or more auxiliary pillows 878 contained within the container for providing a covering to keep the pet warm and provide the pet with a sense of security when the pet is confined in unfamiliar surroundings. In addition, a pet accommodation and confinement kit 840 according to the present invention can further include a collar 864 and detachable leash 862 contained within the container 842, the collar 864 to attach to the pet and the leash 862 to connect to the collar 864 as well as the pet anchoring apparatus 830 to thereby secure the pet to the pet anchoring apparatus as also described above in the context of various embodiments of a pet anchoring apparatus. The container 842 is used to efficiently store the contents of the kit 840 and to easily transport the contents by carrying the container 842. The container 842 can also include a set of wheels 843 so that the container 842 can be pulled using an attached handle [843] as the container rolls easily and efficiently on the included wheels 843.

Various features of the invention as already described further provide elements for a "puppy starter" kit having the additional advantageous feature that the kit, acquired when the dog or other pet is young and small (i.e., is a "puppy"), changes in accordance with the changing weight and height of the pet as it matures (See FIGS. 36–39). Specifically, the kit can include a primary anchoring base 170' along with a plurality additional auxiliary anchoring bases to 190', 210' to provide supplemental restraining weight to the pet anchoring apparatus 180' as the pet's weight increases with age such as shown when the pet has a collar 184' connected to the anchoring base 170' by a restraining cord 182'. The height of the anchoring apparatus 180' also can be increased by adding to primary anchoring base 170' at least a second base, and, as needed, additional supplemental anchoring bases, in a vertical array so as to form a stacked anchoring base as described above. Increasing the height as well as the weight of the anchoring apparatus 180' offers specific advantages with respect to the embodiment of the invention having a pet feeder 200 positioned on the pet anchoring apparatus 180' in that the additional height of the vertically stacked anchoring base permits the feeder 200 to be positioned at a height that more closely corresponds to the height of the pet as it matures. Alternatively, whether the pet feeder is positioned on the pet anchoring apparatus or independently from the pet anchoring apparatus 180', the height of the feeder can be increased using, for example, spacers positioned between the feeder and the surface of the base or the floor above which the feeder is positioned. As also noted above, some studies suggest that an animal's health is improved by its consuming food and water with its head substantially upright rather than bent downward as is the case when a pet feeder is resting on a floor surface. Thus, the pet starter kit provides a number of advantages that accommodate the physical changes in the dog P', P'', P''' or other pet at each stage of its life as it matures.

Not only does the "pet starter" kit provide benefits in terms of the pet's comfort and health, but it also provides convenience for the pet owner, especially the new owner of a young pet. Of necessity, every new pet owner must have the ability to care for the pet from the moment the pet is first acquired. The present invention provides a distinct advantage to the pet owner in the sense that rather than having to acquire from various sources a number of distinct devices to meet the various needs of a new pet, the new pet owner need only acquire the "pet starter" kit at the time the new pet is acquired in order to be able to comfortably confine the pet within a predetermined area from the outset. The kit, specifically, restrains the pet within a predetermined area, provides the pet toys and a bed for the pet to play and rest comfortably within its area of confinement, and provides the pet with a feeder to contain food and water at position easily accessible to the pet. Moreover, as described above, these various features can be modified as the pet matures so as to accommodate the pet's increased height and weight. Thus, the kit accommodates each of the stages of growth of the pet.

FIGS. 1–25 also illustrate the method aspects of the present invention. The present invention provides a method for securing and restraining the movement of a pet within a preselected area. The method preferably includes selecting a location within a predetermined area in which to confine a pet and, while taking into account the portion of the predetermined area in which the pet is to have freedom of movement, placing an anchoring base at the chosen location, wherein the base is substantially as described above in the context of several distinct embodiments of the present invention. The method further includes, then, adjusting the length of a restraining cord based on the position of the base so that the length of the cord in relation to the chosen position when the cord is substantially fully extended reaches the perimeter of the portion of the predetermined area in which the pet is to have freedom of movement and connecting the cord to the anchoring base and connecting the restraining cord to the pet.

The present invention also provides a method for securing and restraining the movement of a pet within a preselected area by filling an inner cavity of an anchoring base with a liquid or particulate matter to thereby change the weight of the anchoring base according to the weight of the pet and securing the pet to the base. Also the present invention provides a method for securing and restraining the movement of a pet within a preselected area by connecting the pet to a base which can be filled with a liquid or particulate matter to change the weight of the base, and by discharging the contents of the inner cavity of the anchoring base when the anchoring base is not being used to restrain the pet so as to thereby make the base easier to use and to transport to a new location.

The present invention further provides an alternative method for changing the weight of an anchoring base to which a pet is to be restrained is connected. One method comprises positioning at least one auxiliary anchoring base adjacent a primary anchoring base to form a combination anchoring base to which a pet can be restrainingly connected to thereby supplement the weight provided by the anchoring base in proportion to the weight of the pet to be connected thereto, the combination anchoring base having a single cord connector for all of the auxiliary bases to thereby restrain a pet when a restraining cord attached to the pet is connected thereto.

Yet a further method for securing and restraining movement of a pet within a preselected area, comprises positioning at least one auxiliary anchoring base to overlie a primary anchoring base having a cord connector associated therewith, the cord connector extending through at least a portion of the at least one auxiliary base, the primary anchoring base and each at least one auxiliary base in combination thereby defining a combination anchoring base having a common cord connector to thereby restrain a pet when a restraining cord attached to the pet is connected thereto.

An additional method for securing and restraining movement of a pet within a preselected area as provided by the present invention comprises positioning a plurality of substantially non-spherical anchoring bases adjacent one another so that each of the plurality of anchoring bases connects to at least one other of the plurality of anchoring bases so as to define a combination anchoring base, each of the plurality of anchoring bases being sufficiently non-spherical to thereby resist rolling responsive to contact with a pet or a person, and restrainingly connecting a pet to the combination anchoring base. The method further can include as part of the positioning step, positioning a common cord connector on the combination anchoring base to thereby restrain a pet when a restraining cord attached to the pet is connected thereto.

Another method that involves changing the weight of an anchoring base secure and restrain movement of a pet within a preselected area comprises positioning a plurality of anchoring bases adjacent one another so that each of the plurality of anchoring bases connects to at least one other of the plurality of anchoring bases so as to define a combination anchoring base, each of the plurality of anchoring bases having a substantially flat bottom surface portion to thereby resist rolling responsive to contact with a pet or a person, and restrainingly connecting a pet to the combination anchoring base. The method can be refined by if the positioning step includes the step of positioning a common cord connector on the combination anchoring base to thereby restrain a pet when a restraining cord attached to the pet is connected thereto.

The present invention also provides a method for securing and restraining the movement of a pet within a preselected area comprising securing the pet to an anchoring base having a primary cover overlying at least the top of the base and being made of a softer material than that of the base, and positioning an auxiliary cover to overlie at least a portion of the base and a corresponding portion of the primary cover with an auxiliary cover, the auxiliary cover formed of a material having patterns preselected patterns associated therewith. The method can further include positioning an auxiliary cover wherein the material forming the auxiliary cover contains patterns associated with the type of pet to be restrained thereby. Alternatively, the method can include positioning an auxiliary cover wherein the material forming the auxiliary cover can contain patterns depicting a thematic scene associated with the pet to be restrained thereby. Still further the method can include positioning an auxiliary cover wherein the auxiliary cover corresponds to the environment of the area within which the pet is to be confined by securing the pet to the anchoring base.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

What is claimed is:

1. A pet anchoring apparatus for securing and restraining the movement of a pet within a preselected area, the pet anchoring apparatus comprising:

a base being formed of a substantially solid material and having a substantially solid bottom surface, a plurality of substantially solid side wall surfaces connected to and extending upwardly from the bottom, and a substantially solid top surface connected to the plurality of side wall surfaces and overlying the bottom surface, the plurality of side wall surfaces in combination defining a non-circular outer perimeter of the base, a combination of a height of one of the plurality of side wall surfaces, a thickness of the bottom surface and a thickness of the top surface defining a height of the base, the height of the base being substantially low to thereby avoid being an obstacle to the movements of a pet or a person near the base, and the base having a weight greater than the pet to be attached thereto;

a cover substantially surrounding at least the top of the base and abuttingly contacting the base, the cover being formed of a softer material than the base;

a plurality of handles formed in the substantially solid base a flexible cord connector associated with the base; and at least one restraining cord having a preselected length and having an end portion thereof connected to the flexible cord connector to secure a pet thereto and thereby restrain the movement of the pet within a preselected area.

2. A pet anchoring apparatus as defined in claim 1, wherein the substantially solid base also has an opening extending substantially vertically through a medial portion thereof, the opening having a first portion substantially adjacent the bottom surface and a second portion positioned above the first portion, the second portion being narrower than the first portion, wherein the flexible cord connector includes a stop member, and wherein the flexible cord connector extends through the opening in the solid base to thereby permit the stop member to restrict the flexible cord connector at a narrower portion of the opening so as to thereby prevent the flexible anchoring connector from passing completely through the opening.

3. A pet anchoring apparatus as defined in claim 1, wherein each of the plurality of handles is formed by a narrowly recessed opening through the base so that the opening is relatively difficult for a paw of a pet to extend therein and yet sufficiently open to thereby permit fingers of a person to extend into the openings to lift and carry the apparatus.

4. A pet anchoring apparatus as defined in claim 3, wherein the plurality of handles have a preselected shape associated with the type of pet to be restrained thereby.

5. A pet anchoring apparatus as defined in claim 1, wherein a combination of the substantially solid base and cover define a first anchoring base, and wherein the apparatus further comprises a second anchoring base positioned to overlie the first anchoring base so that a bottom surface of the second anchoring base contacts the top surface of the first anchoring base to thereby define a stacked position and to thereby add additional weight to the pet anchoring apparatus to restrain larger pets when attached thereto.

6. A pet anchoring apparatus as defined in claim 5, wherein the second anchoring base has a connector opening extending therethrough so that the flexible cord connector extends through both the first and second anchoring bases.

7. A pet anchoring apparatus as defined in claim 1, wherein the top surface of the base is substantially flat to thereby operate in conjunction with the flexible cord connector to eliminate vertically extending and potentially impaling obstructions thereon.

8. A pet anchoring apparatus as defined in claim 1, further comprising suctioning devices extending downwardly from the bottom surface of the substantially solid base to thereby assist in securing the apparatus to a support surface.

9. A pet anchoring apparatus as defined in claim 1, wherein the cover is made of a material having a preselected pattern associated with the type of pet to be restrained.

10. A pet anchoring apparatus as defined in claim 1, wherein the cover abuttingly contacting the base defines a primary cover and wherein the apparatus further comprises an additional cover defining an auxiliary cover, to overlie at least the top of the base and a corresponding portion of the primary cover.

11. A pet anchoring apparatus as defined in claim 10, wherein the auxiliary cover has a preselected pattern associated with the type of pet to be restrained by the apparatus.

12. A pet anchoring apparatus as defined in claim 1, wherein the base further comprises at least one relatively shallow concave surface portion formed in the top surface thereof to alternatively hold water and food in a position accessible to the pet.

13. A pet anchoring apparatus as defined in claim 12, wherein an outermost perimeter of the at least one concave surface portion formed in the top surface of the base has a preselected shape associated with the type of pet to be restrained by the apparatus.

14. A pet anchoring apparatus for securing and restraining the movement of a pet within a preselected area, the pet anchoring apparatus comprising:

a portable base having a bottom surface, a plurality of side wall surfaces connected to and extending upwardly from the bottom surface, a substantially flat top surface connected to the plurality of side wall surfaces and overlying the bottom surface, and an inner cavity enclosed between the bottom, top, and side surfaces of the base to intermittently receive, store, and discharge liquid and particulate matter to thereby increase and decrease the weight of the base as desired; and a substantially flexible cord connector positioned on the top surface of the base, the flexible cord connector and the flat top surface of the base operating in conjunction to eliminate vertically extending and potentially impaling obstructions thereon.

15. A pet anchoring apparatus as defined in claim 14, wherein the portable base also comprises a substantially solid portion, the solid portion being positioned adjacent the inner cavity, extending substantially vertically through the base from the bottom surface to the top surface, and having an opening extending through a medial portion thereof, wherein the opening has first portion substantially adjacent the bottom surface and a second portion positioned above the first portion and being narrower than the first portion, wherein the cord connector includes a stop member, and wherein the cord connector extends through the opening in the solid portion so that the stop member restricts the cord connector at narrower portions of the opening to prevent the cord connector from passing completely through the opening.

16. A pet anchoring apparatus as defined in claim 14 wherein the base includes a plurality of handles formed in the base.

17. A pet anchoring apparatus as defined in claim 16 wherein each of the plurality of handles is formed by a narrowly recessed opening through the base so that the opening is relatively difficult for a paw of the pet to extend into and yet permits fingers of a person to extend into the openings to lift and carry the apparatus.

18. A pet anchoring apparatus as defined in claim 17, wherein the plurality of handles have a preselected shape associated with the type of pet to be restrained thereby.

19. A pet anchoring apparatus as defined in claim 14, wherein the base defines a first anchoring base, and wherein the apparatus further comprises a second anchoring base positioned to overlie the first anchoring base so that a bottom surface of the second anchoring base contacts the top surface of the first anchoring base to thereby define a stacked position and to thereby provide additional liquid and particulate matter storing capacity for increasing the weight of the pet anchoring apparatus to restrain larger pets when attached thereto.

20. A pet anchoring apparatus as defined in claim 19, wherein the second anchoring base has a connector opening extending therethrough so that the cord connector extends through both the first and second anchoring bases.

21. A pet anchoring apparatus as defined in claim 14, further comprising a cover substantially surrounding at least the top of the base and abuttingly contacting the base, the cover being formed of a softer material than the base.

22. A pet anchoring apparatus as defined in claim 21, wherein the cover is made of a material having patterns associated with the type of pet to be restrained.

23. A pet anchoring apparatus as defined in claim 22, wherein the cover defines a primary cover, and where in the apparatus further comprises an additional cover defining an auxiliary cover, the auxiliary cover to thereby overlie at least the top of the base and a corresponding portion of the primary cover.

24. A pet anchoring apparatus as defined in claim 23, wherein the auxiliary cover is made of a material having a preselected pattern associated with the type of pet to be restrained by the apparatus.

25. A pet anchoring apparatus as defined in claim 14, further comprising suctioning devices extending downwardly from the bottom surface of the base to thereby assist in securing the apparatus to a support surface.

26. A pet anchoring apparatus as defined in claim 14, wherein the base further comprises at least one relatively shallow concave surface portion formed in the top surface thereof to alternatively hold water and food in a position that is accessible to the pet.

27. A pet anchoring apparatus as defined in claim 26 wherein an outermost perimeter of the at least one concave surface portion formed in the top surface of the base has a preselected shape associated with the type of pet to be restrained by the apparatus.

28. A pet anchoring apparatus for securing and restraining the movement of a pet within a preselected area, the pet anchoring apparatus comprising:

a base having a bottom surface, a plurality of side wall surfaces connected to and extending upwardly from the bottom surface, and a top surface connected to the plurality of side wall surfaces and overlying the bottom surface, the plurality of side wall surfaces in combination defining a non-circular outer perimeter of the base, the top surface providing a substantially flat and substantially continuously solid surface to reduce any likelihood that a paw of the pet or foot of a person will be entangled within the base to thereby lessen a probability that the pet or person will stumble over the base, and at least one relatively shallow concave surface portion formed in the top surface thereof to alternatively hold water and food that is accessible to the pet; and a cord connector associated with the base, the connector being sufficiently flexible to bend and twist in response to contact with the pet or a person to thereby lessen a probability that the pet or person will be impaled on or stumble over the connector; and at least one restraining cord having a preselected length and having an end portion thereof connected to the flexible cord connector to secure a pet thereto and thereby restrain the movement of the pet within a preselected area.

29. A pet anchoring apparatus as defined in claim 28, wherein the base also has an opening extending substantially vertically through a medial portion thereof, the opening having a first portion substantially adjacent the bottom surface and a second portion positioned above the first portion and being narrower than the first portion, wherein the cord connector includes a stop member, and wherein the cord connector extends upwardly through the opening in the base so that the stop member restricts the cord connector at narrower portions of the opening to prevent the cord connector from passing completely through the opening.

30. A pet anchoring apparatus as defined in claim 28, further comprising at least one handle formed in a surface of the base.

31. A pet anchoring apparatus as defined in claim 30, wherein the at least one handle is formed by a narrowly recessed opening through the base to thereby avoid protruding therefrom as a potentially impaling obstruction, and wherein the opening is relatively difficult for a paw of a pet to extend therein and yet permits fingers of a person to extend into the opening to lift and carry the apparatus.

32. A pet anchoring apparatus as defined in claim 31, wherein the at least one handle has a preselected shape associated with the type of pet to be restrained thereby.

33. A pet anchoring apparatus as defined in claim 28, further comprising a cover substantially surrounding at least the top of the base and abuttingly contacting the base, the cover being formed of a softer material than the base.

34. A pet anchoring apparatus as defined in claim 33, wherein the cover defines a primary cover, and wherein the apparatus further comprises a second cover defining an auxiliary cover, the auxiliary cover to thereby overlie at least the top surface of the base and the corresponding portion of the primary cover.

35. A pet anchoring apparatus as defined in claim 34, wherein the auxiliary cover is made of a material having a preselected pattern associated with the type of pet to be restrained by the apparatus.

36. A pet anchoring apparatus as defined in claim 34, wherein the auxiliary cover is made of a material having a preselected pattern associated with the type of pet to be restrained by the apparatus.

37. A pet anchoring apparatus as defined in claim 28 wherein an outermost perimeter of each at least one concave surface portion formed in the top surface the base has a preselected shape associated with the type of pet to be restrained by the apparatus.

38. A pet anchoring apparatus for securing and restraining the movement of a pet within a preselected area, the pet anchoring apparatus comprising:

a first anchoring base having a first preselected weight;

a second anchoring base having a second preselected weight, the second base adapted to overlie the first base such that a combination of the first and second anchoring bases defines a stacked anchoring base having a weight that can be varied so as to restrain larger pets, the second base having a bottom surface, a plurality of side wall surfaces connected to and extending upwardly from the bottom surface, a top surface connected to the plurality of side wall surfaces and overlying the bottom surface, and an opening extending substantially vertically through a medial portion thereof, the opening having a first portion positioned substantially adjacent the bottom surface and a second portion positioned at a height above the first portion and being narrower than the first portion; and a cord connector associated with the stacked anchoring base, the cord connector including a stop member and positioned to extend through the opening so that the stop member restricts the cord connector at narrower portions of the opening to prevent the cord connector from passing completely through the opening.

39. A pet anchoring apparatus as defined in claim 38, wherein the first and second anchoring bases each includes an opening extending therethrough for receiving a stack connector extending substantially the height of the stacked anchoring base for securing each of the anchoring bases to one another.

40. A pet anchoring apparatus as defined in claim 38, further comprising a first cover substantially surrounding at least a top portion of the first anchoring base and a second cover substantially surrounding at least a bottom portion of the second anchoring base, the first cover being formed of a material that is softer than that of the first anchoring base, the second cover being formed of a material that is softer than that of the second anchoring base, and each cover having a friction coefficient of sufficient magnitude so as to reduce slippage between the first anchoring base and the second anchoring base whenever the bottom portion of the second anchoring base contacts the top portion of the first anchoring base.

41. A pet anchoring apparatus as defined in claim 40, wherein each of the of covers is made of a material having patterns associated with the type of pet to be restrained.

42. A pet anchoring apparatus as defined in claim 41, further comprising an auxiliary cover, to overlie at least a portion of the stacked anchoring base.

43. A pet anchoring apparatus as defined in claim 38, wherein the auxiliary cover is made of a material having a preselected pattern associated with the type of pet to be restrained by the apparatus.

44. A pet anchoring apparatus as defined in claim 38, wherein a top surface of the second anchoring base is substantially flat and the cord connector is substantially flexible, the flat top surface and the flexible cord connector operating in conjunction to eliminate vertically extending and potentially impaling obstructions thereon.

45. A pet anchoring apparatus as defined in claim 38, further comprising suctioning devices extending downwardly from a bottom portion of the first anchoring base to thereby assist in securing the apparatus to a support surface.

46. A pet anchoring apparatus for securing and restraining the movement of a pet within a preselected area, the pet anchoring apparatus comprising:
   a base being formed of a substantially solid material and having a substantially solid bottom surface, a plurality of substantially solid side wall surfaces connected to and extending upwardly from the bottom, and a substantially solid top surface connected to the plurality of side wall surfaces and overlying the bottom surface;
   a pair of opposing handles formed in the substantially solid base, the first handle being positioned adjacent a first side of the base and the second handle being positioned adjacent a second side, wherein the first and second sides define opposing sides;
   a flexible cord connector associated with the base; and
   at least one restraining cord having a preselected length and having an end portion thereof connected to the flexible cord connector to secure a pet thereto and thereby restrain the movement of the pet within a preselected area.

47. A pet anchoring apparatus as defined in claim 46, wherein the substantially solid base also has an opening extending substantially vertically through a medial portion thereof, the opening having a first portion substantially adjacent the bottom surface and a second portion positioned above the first portion and being narrower than the first portion wherein the flexible cord connector includes a stop member, and wherein the flexible cord connector extends through the opening in the solid base so that the stop member restricts the flexible cord connector at narrower portions of the opening to prevent the flexible cord connector from passing completely through the opening.

48. A pet anchoring apparatus as defined in claim 46, wherein each of the opposing handles is formed by a narrowly recessed opening through the base so that the opening is relatively difficult for a paw of a pet to extend into and yet permits fingers of a person to extend into the openings to lift and carry the apparatus.

49. A pet anchoring apparatus as defined in claim 48, wherein the pair of opposing handles have a preselected shape associated with the type of pet to be restrained thereby.

50. A pet anchoring apparatus as defined in claim 46, wherein the substantially solid base defines a first anchoring base, and wherein the apparatus further comprises a second anchoring base positioned to overlie the first anchoring base so that a bottom surface of the second anchoring base contacts the top surface of the first anchoring base to thereby define a stacked position and to thereby add additional weight to the pet anchoring apparatus to restrain larger pets when attached thereto.

51. A pet anchoring apparatus as defined in claim 50, wherein the second anchoring base has a connector opening extending therethrough so that the flexible cord connector extends through both the first and second anchoring bases.

52. A pet anchoring apparatus as defined in claim 46, wherein the top surface of the base is substantially flat to thereby operate in conjunction with the flexible cord connector to eliminate vertically extending and potentially impaling obstructions associated with confining the pet within the preselected area.

53. A pet anchoring apparatus as defined in claim 46, further comprising suctioning devices extending downwardly from the bottom surface of the substantially solid base to thereby assist in securing the apparatus to a support surface.

54. A pet anchoring apparatus as defined in claim 46, further comprising a cover substantially surrounding at least the top of the base and abuttingly contacting the base, the cover being formed of a material that is softer than the base and that has patterns associated with the type of pet to be restrained.

55. A pet anchoring apparatus as defined in claim 54, wherein the cover defines a primary cover and wherein the apparatus further comprises a second cover defining an auxiliary cover, the auxiliary cover to thereby overlie at least the top of the base and a corresponding portion of the primary cover.

56. A pet anchoring apparatus as defined in claim 55, wherein the auxiliary cover is made of a material having a preselected pattern associated with the type of pet to be restrained by the apparatus.

57. A pet anchoring apparatus as defined in claim 46, wherein the base further comprises at least one relatively shallow convex surface portion formed in the top surface thereof to alternatively hold water and food in a position that is accessible to the pet.

58. A pet anchoring apparatus as defined in claim 57, wherein an outermost perimeter of the at least one concave surface portion formed in the top surface of the base has a preselected shape associated with the type of pet to be restrained by the apparatus.

59. A pet accommodating and restraining system for comfortably confining the movement of a pet within a preselected area for a predetermined period of time, the system comprising:
a pet pad, to overlie the surface of the area within which the pet is to be confined
a pet anchoring apparatus separably positioned adjacent the pet pad, the apparatus comprising:
a portable base having a bottom surface, a plurality of side wall surfaces connected to and extending upwardly from the bottom, and a top surface connected to the plurality of side wall surfaces and overlying the bottom surface, a combination of a height of one of the plurality of side wall surfaces, a thickness of the bottom surface and a thickness of the top surface defining a height of the base, the height of the base being substantially low to thereby avoid being an obstacle to the movements of a pet or a person near the base, and the base having a weight greater than the pet to be attached thereto,
a cover substantially surrounding at least the top of the base and abuttingly contacting the base, the cover being formed of a softer material than the base,
at least one handle formed in the base,
a flexible cord connector associated with the base,
at least one restraining cord having a preselected length and having an end portion thereof connected to the flexible cord connector to secure a pet thereto and thereby restrain the movement of the pet within a preselected area; and
a pet feeder positioned adjacent the pet pad to store food and water in a position accessible to the pet.

60. A pet accommodating and restraining system as defined in claim 59, wherein the portable base has an opening extending substantially vertically through a medial portion thereof, the opening, having a first portion substantially adjacent the bottom surface and a second portion positioned above the first portion, the second portion being narrower than the first portion, wherein the flexible cord connector includes a stop member, and wherein the flexible cord connector extends through the opening in the solid base so that the stop member restricts the flexible cord connector at narrower portions of the opening to prevent the flexible anchoring connector from passing completely through the opening.

61. A pet accommodating and restraining system as defined in claim 62, wherein the at least one handle formed in the base is formed by a narrowly recessed opening through the base so that the opening is relatively difficult for a paw of a pet to extend into and yet permits fingers of a person to extend into the opening to lift and carry the apparatus.

62. A pet accommodating and restraining system as defined in claim 61, wherein the at least one handle has a preselected shape associated with the type of pet to be restrained thereby.

63. A pet accommodating and restraining system as defined in claim 59, wherein the base defines a first anchoring base, and wherein the pet anchoring apparatus further comprises a second anchoring base positioned to overlie the first anchoring base so that a bottom surface of the second anchoring base contacts the top surface of the first anchoring base to thereby define a stacked position and to thereby add additional weight to the pet anchoring apparatus to restrain larger pets when attached thereto.

64. A pet accommodating and restraining system as defined in claim 63, wherein the second anchoring base has a connector opening extending therethrough so that the flexible cord connector extends through both the first and second anchoring bases.

65. A pet accommodating and restraining system as defined in claim 59, wherein the top surface of the portable base is substantially flat to thereby operate in conjunction with the flexible cord connector to eliminate vertically extending and potentially impaling obstructions thereon.

66. A pet accommodating and restraining system as defined in claim 59, further comprising suctioning devices extending downwardly from the bottom surface of the portable base to thereby assist in securing the base to a support surface.

67. A pet accommodating and restraining system as defined in claim 59, wherein the cover of the pet anchoring apparatus is made of a material having a pre-selected pattern associated with the type of pet to be restrained.

68. A pet accommodating and restraining system as defined in claim 59, wherein the cover of the pet anchoring apparatus defines a primary cover and wherein the system further comprises an auxiliary cover, the auxiliary cover being formed to fit substantially over at least the top of the base and a corresponding portion of the primary cover.

69. A pet accommodating and restraining system as defined in claim 68, wherein the auxiliary cover is made of a soil resistant material having a preselected pattern associated with the type of pet to be restrained by the apparatus.

70. A pet accommodating and restraining system as defined in claim 59, wherein the portable base of the pet anchoring apparatus further comprises at least one relatively shallow concave surface portion formed in the top surface thereof to alternatively hold water and food in a position accessible to the pet.

71. A pet accommodating and restraining system as defined in claim 70, wherein an outermost perimeter of the at least one concave surface portion formed in the top surface of the base has a preselected shape associated with the type of pet to be restrained by the apparatus.

72. A pet accommodating and restraining system as defined in claim wherein the portable base of the pet anchoring apparatus includes an inner cavity enclosed between the bottom, top, and side surfaces of the base to intermittently receive, store, and discharge liquid and particulate matter to thereby increase and decrease the weight of the base as desired.

73. A pet accommodating and restraining system as defined in claim 59, wherein a combination of the base and cover of the pet anchoring apparatus defines a first anchoring base, and wherein the apparatus further comprises a second anchoring base positioned to overlie the first anchoring base so that a bottom surface of the second anchoring base contacts the top surface of the first anchoring base to thereby define a stacked position and to thereby add additional weight to the pet anchoring apparatus to restrain larger pets when attached thereto.

74. A pet accommodating and restraining system as defined in claim 73, wherein the second anchoring base has a connector opening extending therethrough so that the flexible cord connector extends through both the first and second anchoring bases.

75. A pet accommodating and restraining system as defined in claim 59, wherein the top surface of the base is substantially flat to thereby operate in conjunction with the flexible cord connector to eliminate vertically extending and potentially impaling obstructions thereon.

76. A pet accommodating and restraining system as defined in claim 59, further comprising suctioning devices extending downwardly from the bottom surface of the base to thereby assist in securing the apparatus to a support surface.

77. A pet anchoring apparatus for securing and restraining the movement of a pet within a preselected area, the pet anchoring apparatus comprising:

a portable base having a bottom surface, a plurality of side wall surfaces connected to and extending upwardly from the bottom surface, a top surface connected to the plurality of side wall surfaces and overlying the bottom surface, an inner cavity enclosed between the bottom, top, and side surfaces of the base to intermittently receive, store, and discharge liquid and particulate matter to thereby increase and decrease the weight of the base as desired, and a plurality of handles formed in the base, whereby each of the plurality of handles is formed by a narrowly recessed opening through the base so that the opening is relatively difficult for a paw of the pet to extend into and yet permits fingers of a person to extend into the openings to lift and carry the apparatus; and a cord connector positioned on the top surface of the base.

78. A pet anchoring apparatus for securing and restraining the movement of a pet within a preselected area, the pet anchoring apparatus comprising:

a portable first anchoring base having a bottom surface, a plurality of side wall surfaces connected to and extending upwardly from the bottom surface, a top surface connected to the plurality of side wall surfaces and overlying the bottom surface, and an inner cavity enclosed between the bottom, top, and side surfaces of the base to intermittently receive, store, and discharge liquid and particulate matter to thereby increase and decrease the weight of the base as desired;

a portable second anchoring base positioned to overlie the first anchoring base so that a bottom surface of the second anchoring base contacts the top surface of the first anchoring base to thereby define a stacked position and to thereby provide additional liquid and particulate matter storing capacity for increasing the weight of the pet anchoring apparatus to restrain larger pets when attached thereto; and a cord connector associated with the top surface of at least one of the first and second anchoring bases.

79. A pet anchoring apparatus for securing and restraining the movement of a pet within a preselected area, the pet anchoring apparatus comprising:

a portable base having a bottom surface, a plurality of side wall surfaces connected to and extending upwardly from the bottom surface, a top surface connected to the plurality of side wall surfaces and overlying the bottom surface, and an inner cavity enclosed between the bottom, top, and side surfaces of the base to intermittently receive, store, and discharge liquid and particulate matter to thereby increase and decrease the weight of the base as desired;

a primary cover substantially surrounding at least the top of the base and abuttingly contacting the base, the cover being formed of a softer material than the base and made of a material having patterns associated with the type of pet to be restrained;

an auxiliary cover to thereby overlie at least the top of the base and a corresponding portion of the primary cover; and a cord connector positioned on the top surface of the base.

80. A pet anchoring apparatus for securing and restraining the movement of a pet within a preselected area, the pet anchoring apparatus comprising:

a base having a bottom surface, a plurality of side wall surfaces connected to and extending upwardly from the bottom surface, a top surface connected to the plurality of side wall surfaces and overlying the bottom surface, the plurality of side wall surfaces in combination defining a non-circular outer perimeter of the base, and the top surface providing a substantially flat and substantially continuously solid surface to reduce any likelihood that a paw of the pet or foot of a person will be entangled within the base to thereby lessen a probability that the pet or person will stumble over the base, and an opening extending substantially vertically through a medial portion of the base, the opening having a first portion substantially adjacent the bottom surface and a second portion positioned above the first portion and being narrower than the first portion;

a cord connector associated with the base and including a stop member, the connector extending upwardly through the opening in the base so that the stop member restricts the cord connector at narrower portions of the opening to prevent the cord connector from passing completely through the opening, the connector being sufficiently flexible to bend and twist responsive to contact with the pet or a person to thereby lessen a probability that the pet or person will be impaled on or stumble over the connector; and at least one restraining cord having a preselected length and having an end portion thereof connected to the flexible cord connector to secure a pet thereto and thereby restrain the movement of the pet within a preselected area.

81. A pet anchoring apparatus for securing and restraining the movement of a pet within a preselected area, the pet anchoring apparatus comprising:

a base having a bottom surface, a plurality of side wall surfaces connected to and extending upwardly from the bottom surface, and a top surface connected to the plurality of side wall surfaces and overlying the bottom surface, the plurality of side wall surfaces -in combination defining a non-circular outer perimeter of the base, and the top surface providing a substantially flat and substantially continuously solid surface to reduce any likelihood that a paw of the pet or foot of a person will be entangled within the base to thereby lessen a probability that the pet or person will stumble over the base;

a cord connector associated with the base, the connector being sufficiently flexible to bend and twist in response to contact with the pet or a person to thereby lessen a probability that the pet or person will be impaled on or stumble over the connector;

at least one restraining cord having a preselected length and having an end portion thereof connected to the flexible cord connector to secure a pet thereto and thereby restrain the movement of the pet within a preselected area; and at least one handle formed in a surface of the base by a narrowly recessed opening through the base to thereby avoid protruding therefrom as a potentially impaling obstruction, and wherein the opening is relatively difficult for a paw of a pet to extend therein and yet permits fingers of a person to extend into the opening to lift and carry the apparatus.

82. A pet anchoring apparatus for securing and restraining the movement of a pet within a preselected area, the pet anchoring apparatus comprising:

a base having a bottom surface, a plurality of side wall surfaces connected to and extending upwardly from the bottom surface, and a top surface connected to the plurality of side wall surfaces and overlying the bottom surface, the plurality of side wall surfaces in combination defining a non-circular outer perimeter of the base, and the top surface providing a substantially flat and substantially continuously solid surface to reduce any likelihood that a paw of the pet or foot of a person will be entangled within the base to thereby lessen a probability that the pet or person will stumble over the base;

a first cover defining a primary cover, the primary cover substantially surrounding at least the top of the base and abuttingly contacting the base, the primary cover being formed of a softer material than the base;

a second cover defining an auxiliary cover, the auxiliary cover to thereby overlie at least the top surface of the base and the corresponding portion of the primary cover;

a cord connector associated with the base, the connector being sufficiently flexible to bend and twist in response to contact with the pet or a person to thereby lessen a probability that the pet or person will be impaled on or stumble over the connector; and at least one restraining cord having a preselected length and having an end portion thereof connected to the flexible cord connector to secure a pet thereto and thereby restrain the movement of the pet within a preselected area.

* * * * *